(12) United States Patent
Muller et al.

(10) Patent No.: US 6,401,037 B1
(45) Date of Patent: Jun. 4, 2002

(54) INTEGRATED POSITION AND DIRECTION SYSTEM FOR DETERMINING POSITION OF OFFSET FEATURE

(75) Inventors: Christopher George Muller, Redwood (NZ); James C. Green, Los Altos Hill, CA (US); Richard David Williams, Christchurch (NZ)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

(21) Appl. No.: 09/688,271

(22) Filed: Oct. 11, 2000

Related U.S. Application Data

(63) Continuation-in-part of application No. 09/614,392, filed on Jul. 12, 2000, which is a continuation-in-part of application No. 09/546,236, filed on Apr. 10, 2000.

(51) Int. Cl.[7] .............................. G01C 21/00; G01S 5/02
(52) U.S. Cl. .................. 701/300; 701/213; 342/357.08
(58) Field of Search ................................ 701/214, 216, 701/220, 221, 300, 213; 342/357.02, 357.06, 357.08, 357.14

(56) References Cited

U.S. PATENT DOCUMENTS

| | | | |
|---|---|---|---|
| 4,977,509 A | * 12/1990 | Pitchford et al. | ........... 701/200 |
| 5,379,045 A | 1/1995 | Gilbert et al. | .............. 342/357 |
| 5,572,217 A | * 11/1996 | Flawn | ................... 342/357.08 |
| 6,064,942 A | * 5/2000 | Johnson et al. | ............. 342/118 |
| 6,108,071 A | * 8/2000 | Landry et al. | ................. 356/28 |
| 6,236,938 B1 | * 5/2001 | Atkinson et al. | ...... 342/357.02 |
| 6,243,660 B1 | * 6/2001 | Hsu et al. | ..................... 33/319 |

* cited by examiner

Primary Examiner—Michael J. Zanelli
(74) Attorney, Agent, or Firm—Wagner, Murabito & Hao LLP

(57) ABSTRACT

An integrated position and direction system is disclosed that includes a digital compass, wherein the digital compass includes at least three sensors, and a satellite positioning system (SATPOS) having a receiver adapted to receive satellite position determining signals. Direction is determined using the digital compass and heading is determined using the SATPOS. At a first location, the integrated position and direction system is oriented to the offset feature and is operated to determine a first set of measurements relative to the offset feature using the digital compass and the satellite positioning system. At a second location, the integrated position and direction system is oriented to the offset feature and is operated to determine a second set of measurements relative to the offset feature using the digital compass and the satellite positioning system. The integrated position and direction system calculates the position of the offset feature using the first and second sets of measurements.

32 Claims, 27 Drawing Sheets

INTEGRATED POSITION AND DIRECTION SYSTEM FOR DETERMINING POSITION OF OFFSET FEATURE

CROSS REFERENCE TO RELATED APPLICATION

This application is a continuation-in-part of Ser. No. 09/614,392 Jul. 12, 2000 which is a continuation-in-part of Ser. No. 09/546,236 Apr. 10, 2000.

TECHNICAL FIELD

This invention relates to position determination systems. Specifically, the present invention relates to a method and apparatus for determining position of an offset feature.

BACKGROUND ART

Satellite positioning system (SATPOS) devices that determine position using the satellites of the US Global Positioning System (GPS) are commonly used for navigation of vessels, vehicles, airplanes, and other conveyances. SATPOS devices are also used for surveying, construction site planning and management, mining, oil and gas exploration and development, etc. Also, handheld SATPOS devices are used for personal navigation, data collection, data maintenance, etc.

SATPOS devices are quite effective for indicating the position of the SATPOS device. Position is typically indicated using either an alphanumeric indication of position or by displaying a map that indicates position. Alphanumeric indications of position typically include coordinates such as, for example, Latitude and Longitude, World Geodetic Survey (WGS) Coordinates, etc.

Map displays typically indicate position by an icon or other indicator visible on a map. One such map display, typically referred to as a moving map display, displays the position of the SATPOS in the center of the displayed map. Such map displays typically are oriented such that the top of the SATPOS device's display indicates North (either magnetic North or true North). That is, irrespective of the direction in which the SATPOS device is actually oriented, North is shown at the top of the display. For users that intuitively know which direction is North, such maps are adequate for locating features displayed on the map. However, for users that do not know where North is, or when visibility is obscured such that the user cannot determine where North is, such maps are inadequate for guiding the user to a destination or feature on the map.

For many commercial applications of SATPOS systems, such as construction site planning and management, surveying, navigation, etc., it is essential that an operator be able to locate features displayed on the map. Such users typically operate a separate device for indicating direction such as a conventional magnetic compass.

Some SATPOS devices indicate the direction of movement of the SATPOS device, typically referred to as "heading." Typically, heading is determined by analysis of determined position in relation to prior determinations of position as the SATPOS moves. Typically, SATPOS devices that indicate heading use a map display oriented such that the top of the SATPOS unit (e.g., the top of the unit's display) corresponds to North(either magnetic North or true North).

Some prior art SATPOS devices orient the displayed map such that the top of the SATPOS unit (e.g., the top of the unit's display) corresponds to the direction of movement calculated by the SATPOS device. This gives a good approximation of the user's heading as long as the user continues to move and as long as the SATPOS unit is oriented in the direction of movement, allowing a user to easily determine the location of features visible on the display.

However, when the SATPOS device stops moving, determination of heading can no longer be made. Some SATPOS systems maintain the previous heading for orienting the moving map display for a given time interval. Other prior art SATPOS systems default to positioning North at the top of the map. This can be quite confusing to the user.

Recently, digital compasses have been developed that can indicate direction. However, digital compasses must be calibrated to properly align the digital compass prior to use. Also, each time that magnetic environment around the compass changes, the digital compass must be recalibrated. Digital compasses are typically calibrated by moving the digital compass in a full horizontal arc. The calibration process takes time and is prone to operator error. Also, calibration error can occur as a result of local magnetic anomalies.

Typically, extensive measuring equipment is utilized to determine the position of an offset feature which is inaccessible or which is inconvenient to access. Time and resources are spent. Moreover, more than one person is typically needed to accomplish the task.

What is needed is a method and apparatus for providing an accurate indication of heading to a user of a SATPOS device. Also, a method and apparatus is needed that meets the above needs and that accurately indicates direction when the SATPOS is not moving. Also, a method and apparatus is needed that is easy to use and that does not require a user to manually calibrate a compass. Also, a method and apparatus is needed that facilitates determining position of an offset feature without setting up extensive measuring equipment. The present invention meets the above needs.

DISCLOSURE OF THE INVENTION

The present invention provides a method and apparatus that accurately indicates direction and heading to a user of a satellite positioning system (SATPOS) device. The integrated position and direction system of the present invention includes a digital compass for indicating direction when the SATPOS is not accurately determining direction. In one embodiment, the digital compass is comprised of at least three sensors.

An integrated position and direction system is disclosed that includes a SATPOS having a receiver adapted to receive satellite position determining signals. The integrated position and direction system of the present invention also includes a digital compass that is adapted to determine direction.

The integrated position and direction system also includes a controller for controlling the operations of the integrated position and direction system. The controller is coupled to the SATPOS, the digital compass, and to a display.

In one embodiment of the present invention, when the SATPOS is moving, the direction of movement or "heading" determined by the SATPOS is indicated on the display. When the SATPOS is not moving, the direction given by the digital compass is indicated on the display. Therefore, while the SATPOS is moving, the heading is indicated, and when the SATPOS is not moving, direction is indicated using the digital compass. Thus, the present invention provides a method and apparatus for providing an accurate indication of both heading and direction to a user of a SATPOS device.

In one embodiment, the digital compass is automatically calibrated by the SATPOS when the SATPOS is moving. This calibration can be initiated by the user or can be fully automatic. More particularly, the digital compass of the present invention is calibrated automatically, either as a result of user input (e.g., selection of an icon, pressing of a button, etc.), or as a result of user-defined criteria for automatic calibration. That is, the user can program the present invention to automatically calibrate the digital compass (e.g. when velocity exceeds a given threshold, whenever the SATPOS begins moving, periodically while the SATPOS is moving, when the difference between the SATPOS determined heading differs from the heading indicated by the digital compass by more than a predetermined threshold, etc.) Thus, the position and direction system of the present invention is easy to use because there in no need for a user to calibrate a compass as is required using a prior art compass alone.

The present invention also provides a method and apparatus for determining position of an offset feature. In one embodiment, an integrated position and direction system is described that includes a digital compass and a satellite positioning system, and which is operable to determine the position of an offset feature.

In one embodiment, the integrated position and direction system is oriented so as to indicate the direction to the offset feature at a first location and is operated to determine a first direction to the offset feature relative to the first location using the digital compass and to determine a first position using the satellite positioning system.

The integrated position and direction system is moved and placed at a different location, referred to hereafter as a "second location". At the second location, the integrated position and direction system is oriented so as to indicate the direction of the offset feature relative to the second location and is operated (e.g., by pressing a button) to determine a second direction to the offset feature using the digital compass and to determine a second position using the satellite positioning system. The integrated position and direction system calculates the position of the offset feature using the first and second directions and the first and second positions.

These and other objects and advantages of the present invention will no doubt become apparent to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as to not unnecessarily obscure aspects of the present invention.

Figure 1:
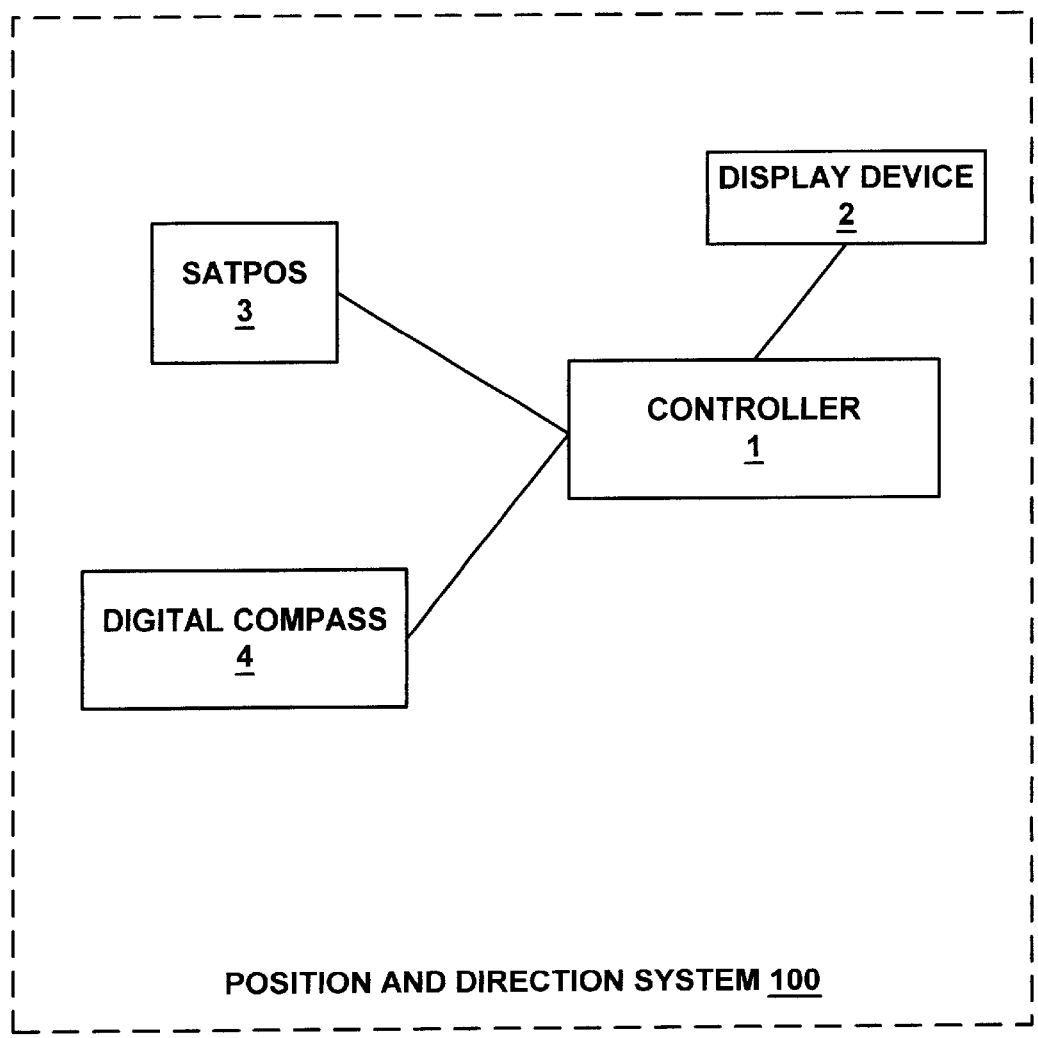
FIG. 1 is a diagram of a position and direction system in accordance with one embodiment of the present invention.

FIG. 1 is a logical representation of components of integrated position and direction system 100 in accordance with one embodiment of the present invention. Integrated position and direction system 100 includes Satellite Positioning System (SATPOS) 3 that is operable for determining position. In one embodiment, SATPOS 3 is adapted to determine position using a Satellite Positioning System such as the U.S. Global Positioning System (GPS).

In operation, SATPOS 3 determines the location of SATPOS 3 by analysis of satellite position determining signals such as signals from satellites of the U.S. GPS. Position signal processing circuitry in SATPOS 3 also determines the direction of movement of SATPOS 3, referred to hereinafter as "heading" and couples the determined heading to controller 1. In the present embodiment, heading is determined by comparing satellite position determining signals received as the integrated position and direction system 100 moves.

Integrated position and direction system 100 of FIG. 1 also includes digital compass 4. Digital compass 4 is operable to determine direction and couple direction to controller 1. More particularly, in the present embodiment, digital compass 4 determines the compass direction that corresponds to the orientation of the integrated position and direction system 100.

Continuing with FIG. 1, controller 1 controls the operation of integrated position and direction system 100. In one embodiment, controller 1 is a general-purpose computer. Alternatively, controller 1 is an integrated circuit device such as a microcontroller or an Application Specific Integrated Circuit (ASIC) device or a Field Programmable Gate Array (FPGA) device. In one embodiment, the functions of controller 1 are performed by a general purpose microprocessor that is operable to execute instructions contained in one or more software program(s).

In the present embodiment, controller 1 is operable to display the determined position and the determined direction and/or heading on display 2. Display device 2 may be a liquid crystal device, flat panel display, or other display device suitable for creating graphic images and alphanumeric characters recognizable to the user.

Figure 2:
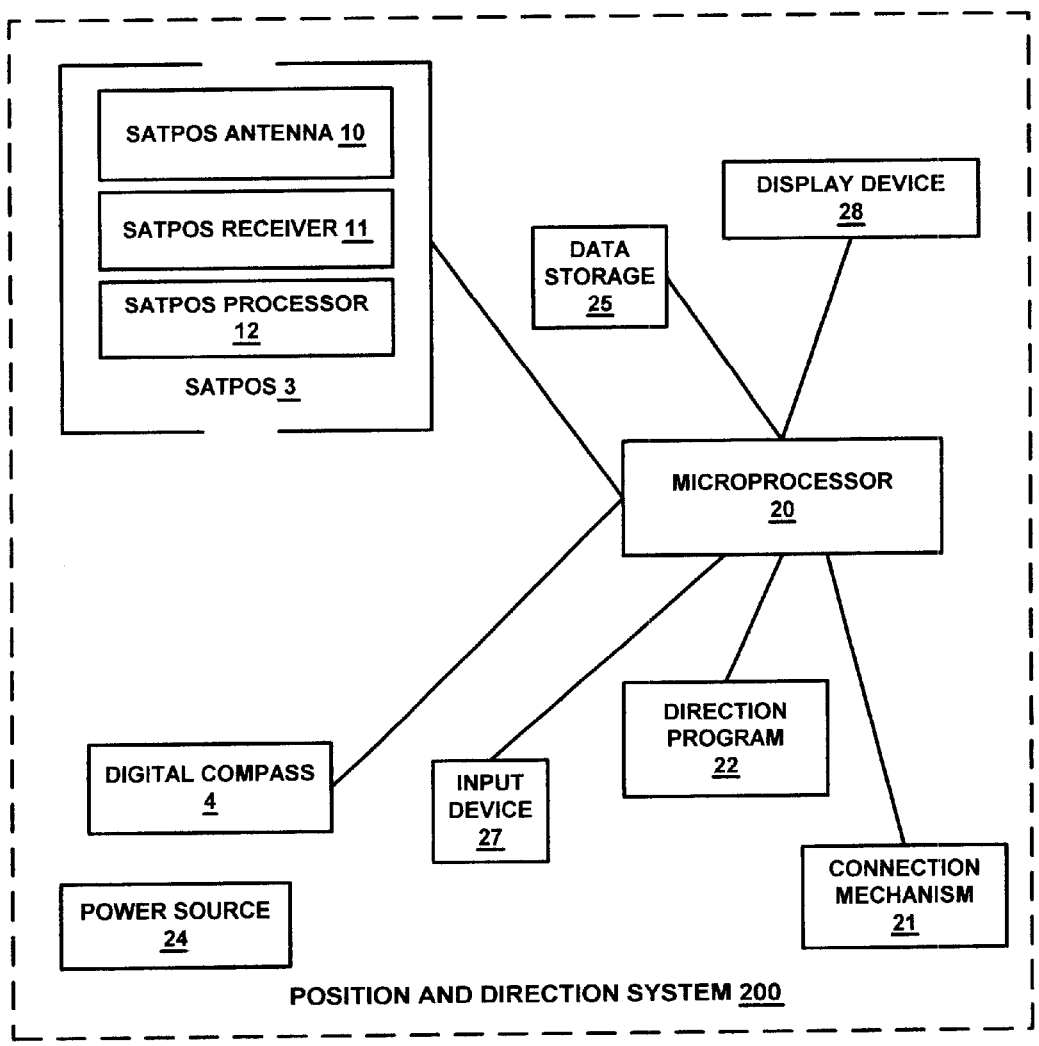
FIG. 2 is a diagram of an embodiment of the position and direction system of FIG. 1 in accordance with one embodiment of the present claimed invention.
Figure 3:
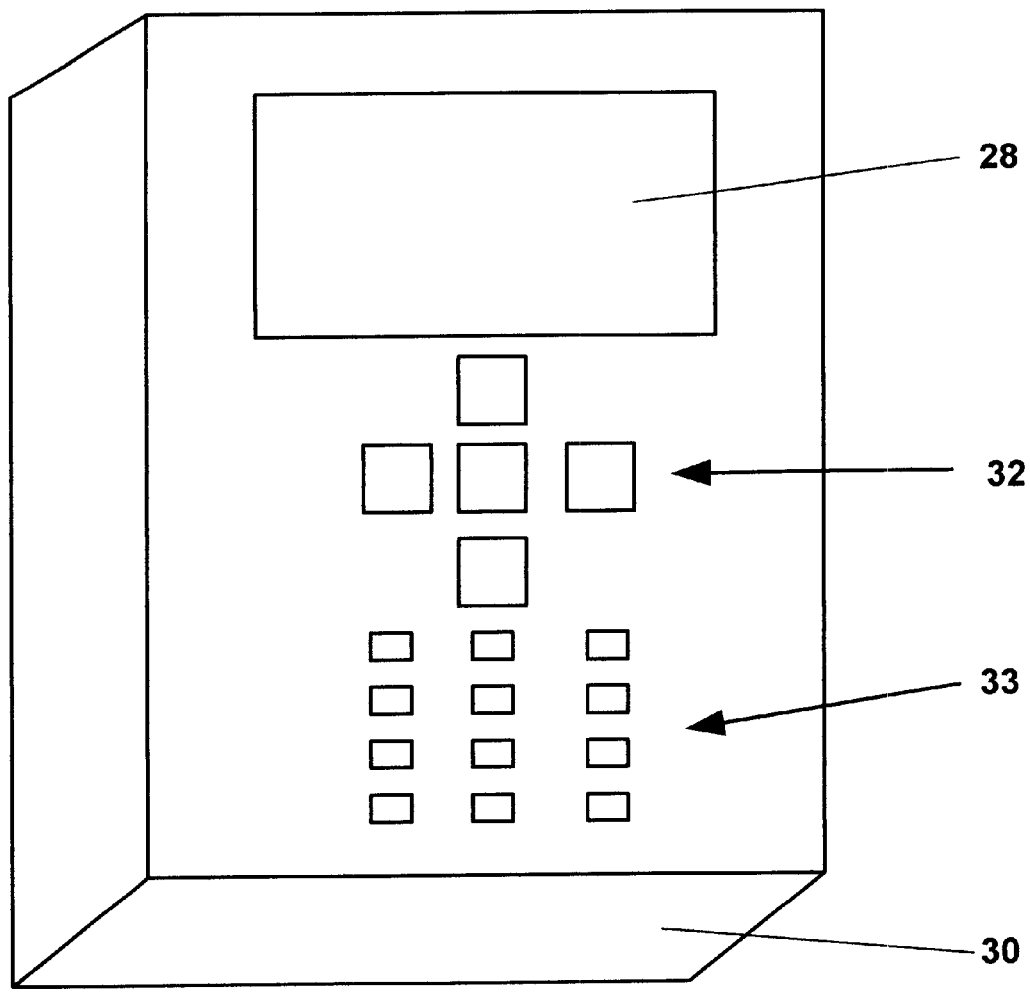
FIG. 3 is a perspective view of an embodiment of the position and direction system of FIG. 2 in accordance with one embodiment of the present claimed invention.

FIGS. 2–3 show an embodiment of the present invention that is incorporated into a handheld portable housing. That is, the housing is small enough to fit into a user's hand.

Referring now to FIG. 2, integrated position and direction system 200 is shown to include SATPOS 3 that is operable for determining position. In the present embodiment, SATPOS 3 includes SATPOS antenna 10, SATPOS receiver 11, and SATPOS processor 12. In one embodiment, SATPOS processor 12 is a GPS processor made by Trimble Navigation, Ltd. of Sunnyvale, Calif. In this embodiment, SATPOS antenna 10 is an ACE II GPS™ antenna, manufactured by Trimble Navigation, Ltd. and SATPOS receiver 11 includes a SIERRA GPS™ chipset, manufactured by Trimble Navigation, Ltd. Although such a specific implementation is described, the present invention is also well suited to an embodiment having various other components and features.

Referring still to FIG. 2, microprocessor 20, in conjunction with direction program 22 perform the functions of controller 1 of FIG. 1. That is, in the present embodiment, direction program 22, operable on microprocessor 20 controls the operations of integrated position and direction system 200. In the present embodiment, microprocessor 20 is a general-purpose microprocessor that has low power consumption such as, for example, a Motorola RISC microprocessor made by Motorola Inc., of Austin, Tex. Alternatively, other types of processors, an ASIC device or a FPGA device can be used.

Continuing with FIG. 2, power source 24 provides power to the various components of integrated position and direction system 200. Power source 24 may be any suitable power source that is light-weight and compact such as, for example, built-in rechargeable batteries, AA batteries or AAA batteries.

Data storage device 25 is coupled to controller 20 and is adapted to store data. Data that can be stored in data storage device 25 includes, for example, an operating software program such as direction program 22. Data storage device 25 may be any type of digital data storage medium. In one embodiment, data storage device 25 is a Random Access Memory (RAM) device such as, for example, a Static Random Access Memory (SRAM) device, a Dynamic Random Access Memory (DRAM) device. Alternatively, other types of memory storage devices such as flash memory, tape, CD ROM, or DVD may be used.

Referring still to FIG. 2, connection mechanism 21 is coupled to microprocessor 20 and is adapted to connect to external devices such as, for example external computers. This allows for easily and quickly downloading new programs for operation on microprocessor 20 and allows for updating direction program 22. In one embodiment, connection mechanism 21 is a connector that complies with the RS-232 standard.

With reference again to FIG. 2, display device 28 is also electrically coupled to microprocessor 20. In one embodiment, display device 20 is an active matrix liquid crystal display. Alternatively a cathode ray tube, or other display device suitable for creating graphic images and alphanumeric characters recognizable to the user can be used.

Input device 27 is coupled to microprocessor 20 and allows for coupling user input to microprocessor 20. In the present embodiment, input device 27 includes function keys and an alphanumeric keypad. Alternatively, input device 27 includes a trackball, mouse, touch pad, joystick. The present invention is also well suited to receiving user input by other means such as, for example, voice commands.

Referring now to FIG. 3, an embodiment of position and direction system 200 is shown that is incorporated into housing 30 that is small enough to hold in a user's hand. In the present embodiment, function keys 32 and alphanumeric keypad 33 allow for coupling user input to position and direction system 200. In one embodiment, one or more of function keys 32 operates as a cursor control device. That is, one or more of function keys 32 allows the computer user to dynamically signal the two-dimensional movement of a visible symbol (cursor) on the display screen of display device 28.

Figure 4:
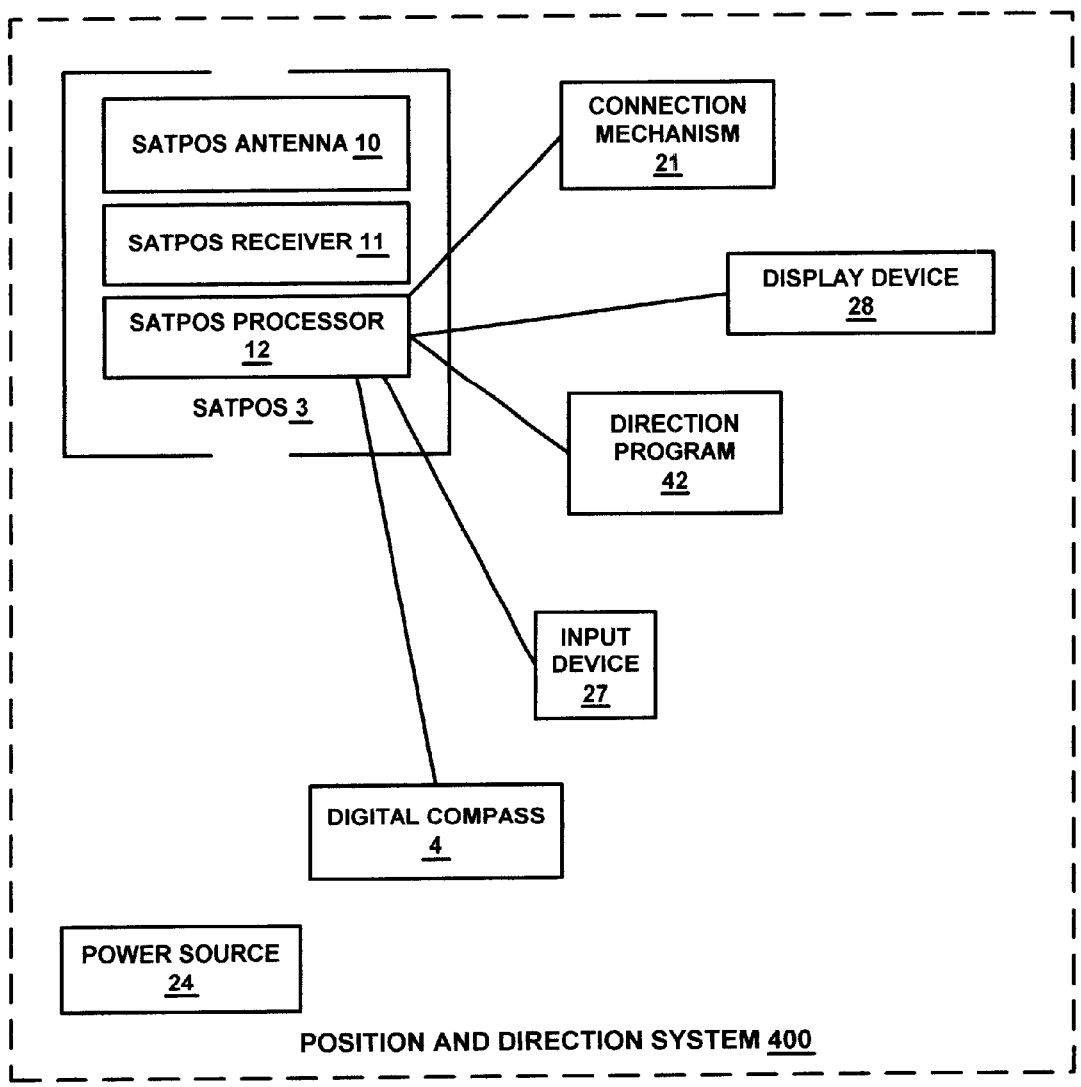
FIG. 4 is a diagram of a position and direction system in accordance with one embodiment of the present claimed invention.

FIG. 4 shows an embodiment of the present invention in which SATPOS processor 12 is used for controlling the operations of the integrated position and direction system 400. Because SATPOS processor 12 is used for controlling the operations of integrated position and direction system 400, there is no need for a second microprocessor such as microprocessor 20 of FIG. 2.

In the embodiment shown in FIG. 4, SATPOS processor 12 is operable to determine position and heading using SATPOS signals and is also operable to receive direction determined by digital compass 4. In this embodiment, SATPOS processor 12 includes instructions for determining which source of direction signals (heading from SATPOS signals or direction determined by digital compass 4) is to be indicated (e.g., displayed) on display device 28. In the present embodiment, these instructions are contained in direction program 42 that controls the operations of integrated position and direction system 400. Direction program 42 is a computer program that is operable on SATPOS processor 12. However, alternatively, instructions necessary for the operation of integrated position and direction system 400 can be implemented on an ASIC, a FPGA, or similar device.

In the present embodiment, position is indicated on display device 28. In one embodiment, position is indicated alphanumerically using latitude and longitude. Alternatively, position is indicated by an icon displayed on a moving map display.

In the present embodiment, reference to a satellite position determination system, or "SATPOS" herein refers to a Global Positioning System (GPS), to a Global Orbiting Satellite System (GLONASS), to a hybrid system that is capable of using satellites from the GPS and the GLONASS, and to any other positioning system, including pseudolites, that provide signals that can be used to determine position. The term "satellite position determination system" and "SATPOS" as used herein, is intended to include position determination using pseudolites or equivalents of pseudolites, and the term "satellite position determination system signals" and "SATPOS signals," as used herein, is intended to include position determination system-like signals and data from pseudolites or equivalents of pseudolites. Also, signals from other sources such as LORAN, Wide Area Augmentation System (WAAS) satellites, etc. may be used to determine position.

In the embodiments shown in FIGS. 1–4, digital compass 4 is used to determine direction. In the present embodiment, digital compass 4 is a compass that determines direction by detection of electromagnetic flux. In the present embodiment, digital compass 4 is a magnetic field sensor made by Honeywell, Inc. Any of a number of different types of commercially available digital compasses can be used.

Figure 11:
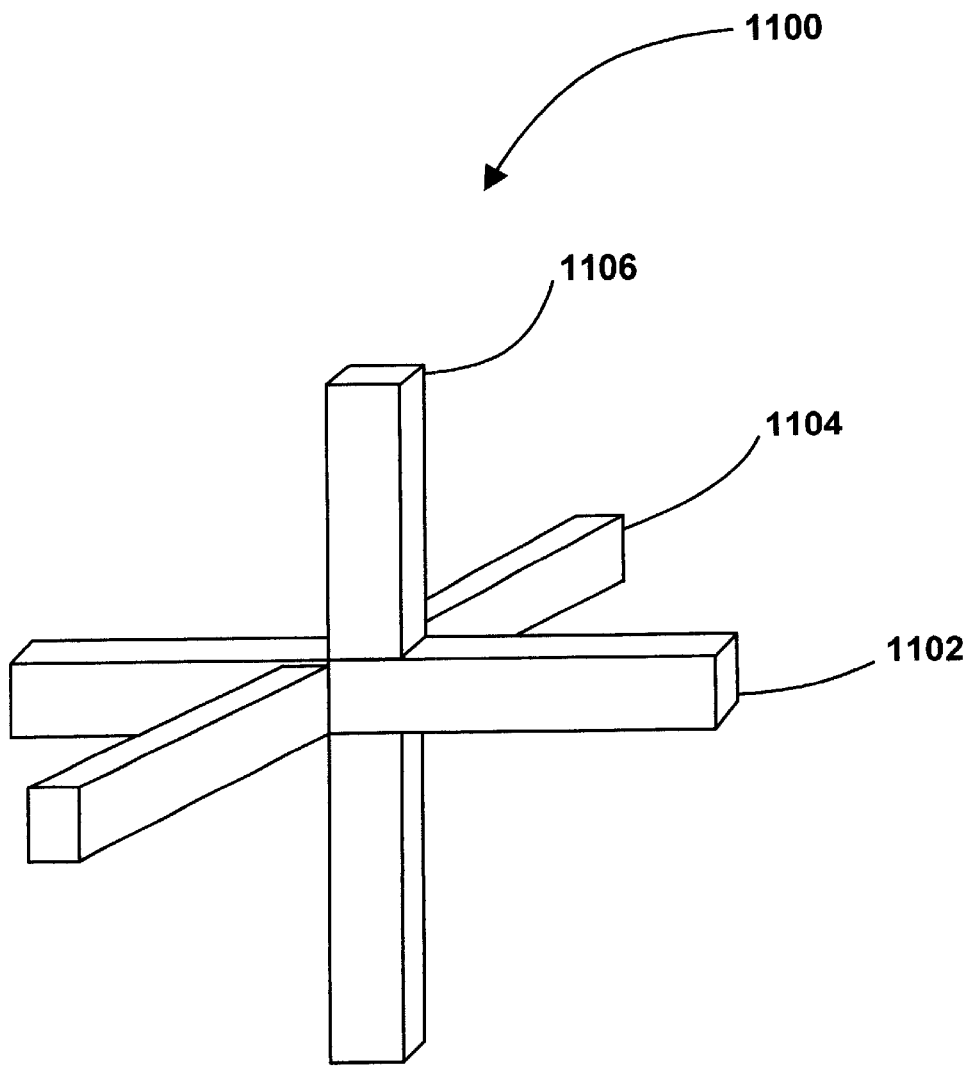
FIG. 11 is a schematic representation of an exemplary configuration for a 3-Sensor magnetic sensor in accordance with one embodiment of the present claimed invention.

Referring now to FIG. 11, a schematic representation of a magnetic field sensor 1100 in accordance with one embodiment of the present invention is shown. In this embodiment, magnetic field sensor 1100 is comprised, in part, of three sensors 1102, 1104, and 1106. By having three sensors, magnetic field sensor 1100 is able to determine the elevation angle of integrated position and direction system 100 of FIG. 1. More specifically, in one embodiment, sensors 1102 (x-direction sensor) and 1104 (y-direction sensor) determine the azimuthal orientation of integrated position and direction system 100. However, the determination of azimuthal orientation will determined with the assumption that integrated position and direction system 100 is held level. Thus, if, for example, a user of integrated position and direction system 100 is walking up a steep hill; walking down a steep hill; holding the integrated position and direction system 100 in a vertically oriented manner; and the like, the accuracy of the determined azimuthal orientation may be severely compromised. By using magnetic field sensor 1100 which includes sensor 1106 (z-direction sensor), the present embodiment is able to correctly determine the azimuthal orientation of integrated position and direction system 100 by correcting for any variation from horizontal in the position of integrated position and direction system 100. That is, sensor 1106 of the present embodiment determines the variance in integrated position and direction system 100 from a truly horizontal position. It will be understood that in the representation of FIG. 11, when integrated position and direction system 100 is at a truly horizontal position, sensor 1106 will be vertically oriented. Although a specific schematic implementation is shown in FIG. 11, the present invention is well suited to use with any of a number of different types of commercially available digital compasses which compensate for variations from a horizontal orientation.

Referring still to FIG. 11, in one embodiment, in addition to correcting the determined azimuthal orientation of integrated position and direction system 100 for variance from a truly horizontal orientation, the present invention also determines (and optionally displays) the elevation angle of integrated position and direction system 100. In such an embodiment, the user is made aware not only of the accurate azimuthal orientation (i.e. the direction in which integrated position and direction system 100 is pointed), but the user is also informed of the elevation angle at which integrated position and direction system 100 is oriented. Hence, the user can determine, for example, the slope of a hill by holding integrated position and direction system 100 parallel to the surface of the hill and reading the determined elevation angle. Additionally, although magnetic field sensor 1100 is comprised, in part, of three orthogonally oriented sensors 1102, 1104, and 1106 in the present embodiment, the present invention is also well suited to an embodiment in which more than three sensors are used and to an embodiment in which the plurality of sensors are arranged other than orthogonally.

Figure 5:
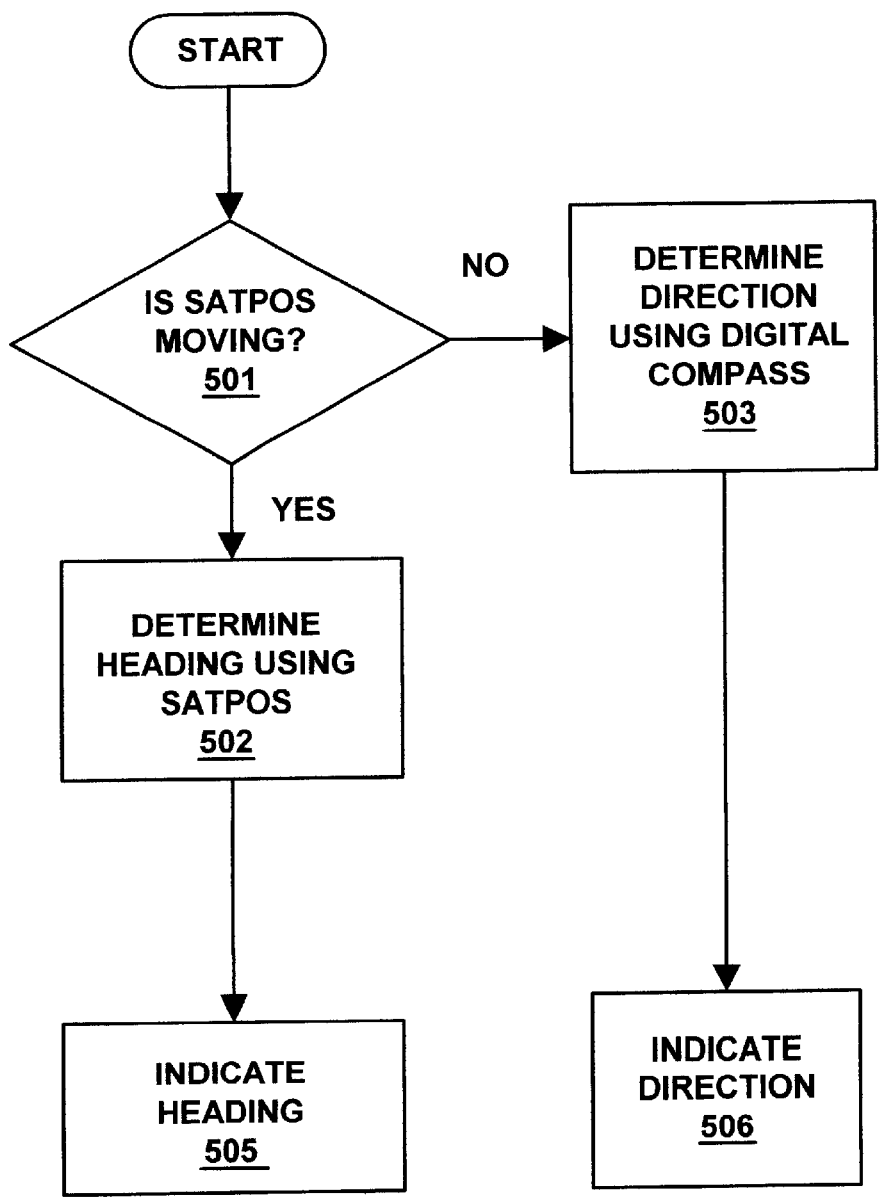
FIG. 5 is a flow chart illustrating a method for indicating direction and heading in accordance with one embodiment of the present invention.

FIG. 5 shows a method for indicating direction and heading according to one embodiment of the present invention. As shown by steps 501–502, when the SATPOS is moving, heading is determined using the SATPOS. In the present embodiment, a satellite positioning system including a receiver adapted to receive satellite position determining signals such as, for example, SATPOS 3 of FIGS. 1–4 is used to both determine whether the SATPOS is moving and to determine heading.

In one embodiment of the present invention, the determination of whether the SATPOS is moving (step 501) is made by comparing the velocity of movement to a threshold velocity. In the present embodiment, prior determinations of position are compared to the most recent determination of position, along with the time of each determination of position to determine the velocity of movement of the SATPOS. When the velocity is determined to be greater than the threshold velocity, the SATPOS is considered to be moving.

As shown by step 505 of FIG. 5, when the SATPOS is moving, heading is indicated using the heading determined in step 502. In the embodiment shown in FIG. 1, display device 2 is used to indicate heading; and in the embodiment shown in FIGS. 2–3, display device 28 is used to indicate heading.

Still referring to FIG. 5, when the SATPOS is not moving, as shown by steps 501 and 503, direction is determined using the digital compass. In the present embodiment digital compass 4 of FIGS. 1–4 is used for determining direction.

As shown by step 506 of FIG. 5, when the SATPOS is not moving, direction is indicated using the direction determined by the digital compass in step 503. In the embodiment shown in FIG. 1, display device 2 is used to indicate direction; and in the embodiment shown in FIGS. 2–3, display device 28 is used to indicate direction.

The indications of direction and heading steps 505–506 can take any of a number of different forms. In one embodiment, heading and direction are indicated using a displayed compass rose. That is, icons representing a compass rose are displayed on, for example, display device 2 of FIG. 1 or display device 28 of FIGS. 2–3.

Figure 6A:
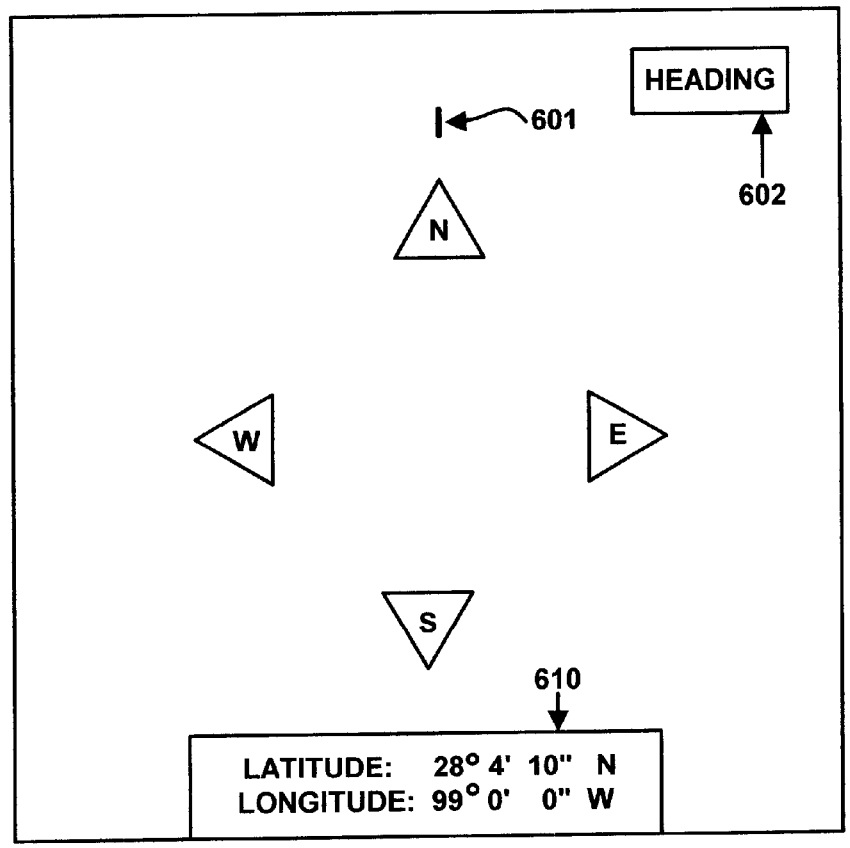
FIG. 6A is a diagram showing an exemplary display that indicates position and heading in accordance with one embodiment of the present claimed invention.
Figure 6B:
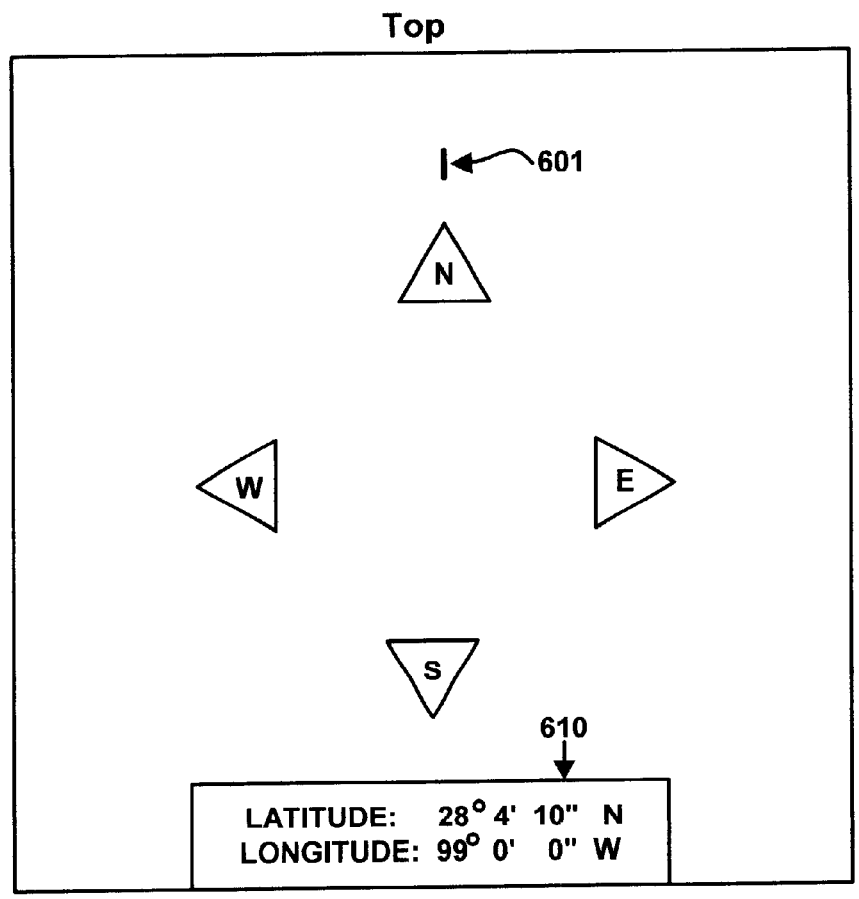
FIG. 6B is a diagram showing an exemplary display that indicates position and direction in accordance with one embodiment of the present claimed invention.

In one embodiment of the present invention the direction and heading indicated in steps 505–506 are indicated using a four-point compass rose. That is, direction is indicated relative to the compass points of North(N.), South(S.), East(E.), and West(W.). FIGS. 6a–6b show exemplary displays 600a–600b that include a four-point compass rose that can be used to indicate either heading (step 505 of FIG. 5) or direction (step 506 of FIG. 5).

Referring now to FIGS. 6a–6b, in the present embodiment, an icon is used to indicate whether heading is being displayed or whether direction is being displayed. More particularly, in display 600a of FIG. 6a, icon 602 is displayed to indicate to the user that heading is being displayed. Referring now to FIG. 6B, display 600b indicates that direction is being displayed. That is, the absence of icon 602 of FIG. 6A indicates that the digital compass is being used and that direction is being displayed.

In the embodiments shown in FIGS. 6A–6B, the compass rose is displayed such that direction and heading are indicated relative to alignment mark 601. That is, the compass rose is rotated such that the proper direction or heading is always indicated by reference to alignment mark 601. Thus, in the embodiment shown in FIG. 6A, because the compass point of N. is aligned with alignment mark 601, display 600a indicates that the SATPOS has a heading directly to the North. Similarly, in the embodiment shown in FIG. 6B, because the compass point of N is aligned with alignment mark 601, display 600b indicates a North direction. That is, the SATPOS is oriented such that alignment mark 601 is pointing directly to the North.

Figure 7A:
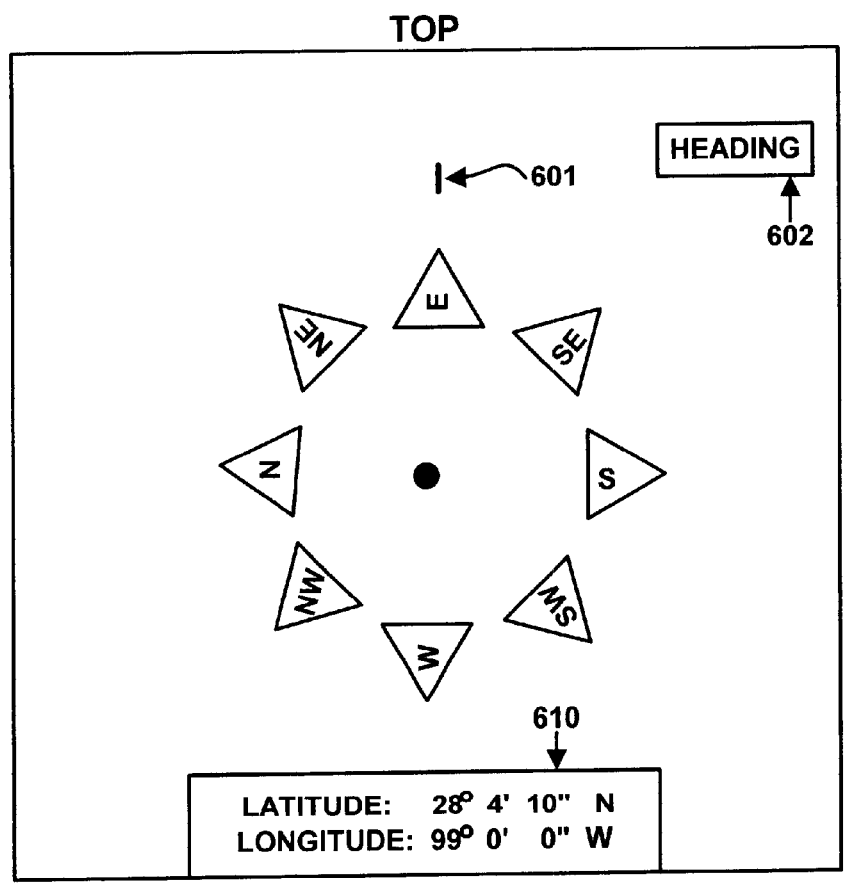
FIG. 7A is a diagram showing an exemplary display that indicates position and heading in accordance with one embodiment of the present claimed invention.
Figure 7B:
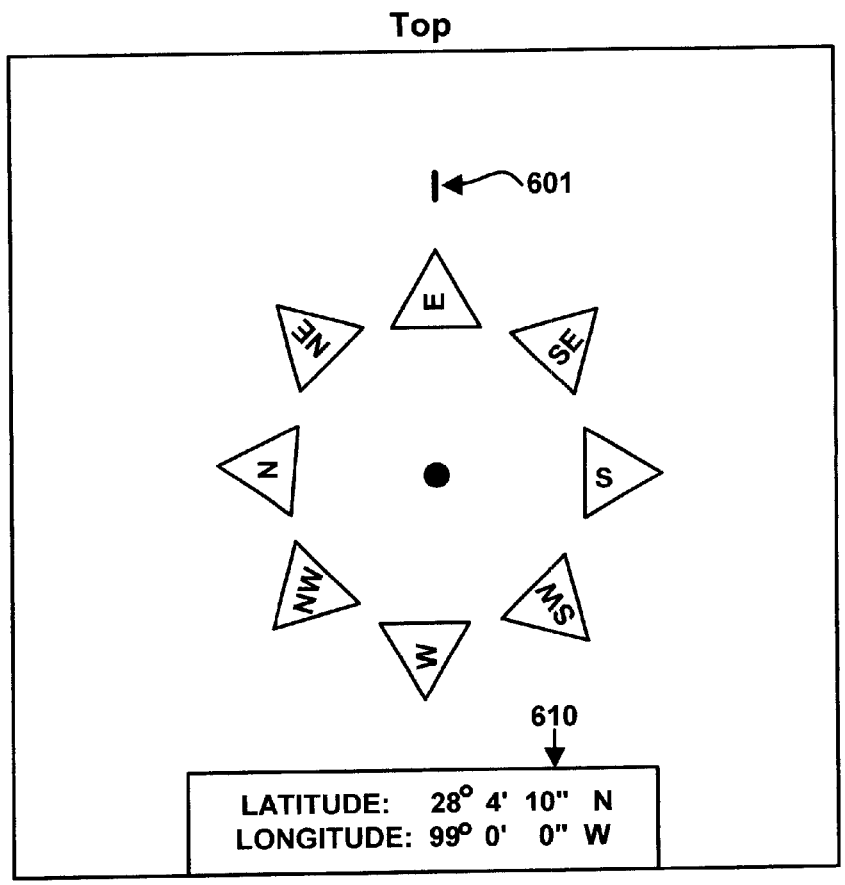
FIG. 7B is a diagram showing an exemplary display that indicates position and direction in accordance with one embodiment of the present claimed invention.

FIGS. 7A–7B shown an embodiment in which direction and heading are indicated using an eight-point compass rose. That is, direction and heading are indicated relative to the compass points of North(N.), South(S.), East(E.), West(W.), North East(NE.), South East(SE.), South West(SW.), and North West(NW.).

Referring now to FIGS. 7A–7B, exemplary displays 700a and 700b are shown to include an eight-point compass rose that can be used to indicate either heading (step 505 of FIG. 5) or direction (step 506 of FIG. 5). As in the embodiment shown in FIGS. 6A–6B, direction and heading are indicated relative to alignment mark 601 and icon 602 indicates whether direction or heading is being displayed.

In the embodiment shown in FIG. 7A, because the compass point of E is aligned with alignment mark 601, and because icon 602 is displayed, display 700a indicates that the SATPOS has a heading directly to the East. Similarly, in the embodiment shown in FIG. 7B, because the compass point of E is aligned with alignment mark 601, and because icon 602 is not displayed, display 700b indicates a East direction. That is, the SATPOS is oriented such that the top of the display, as indicated by alignment mark 601, is pointing directly to the East.

Figure 8A:
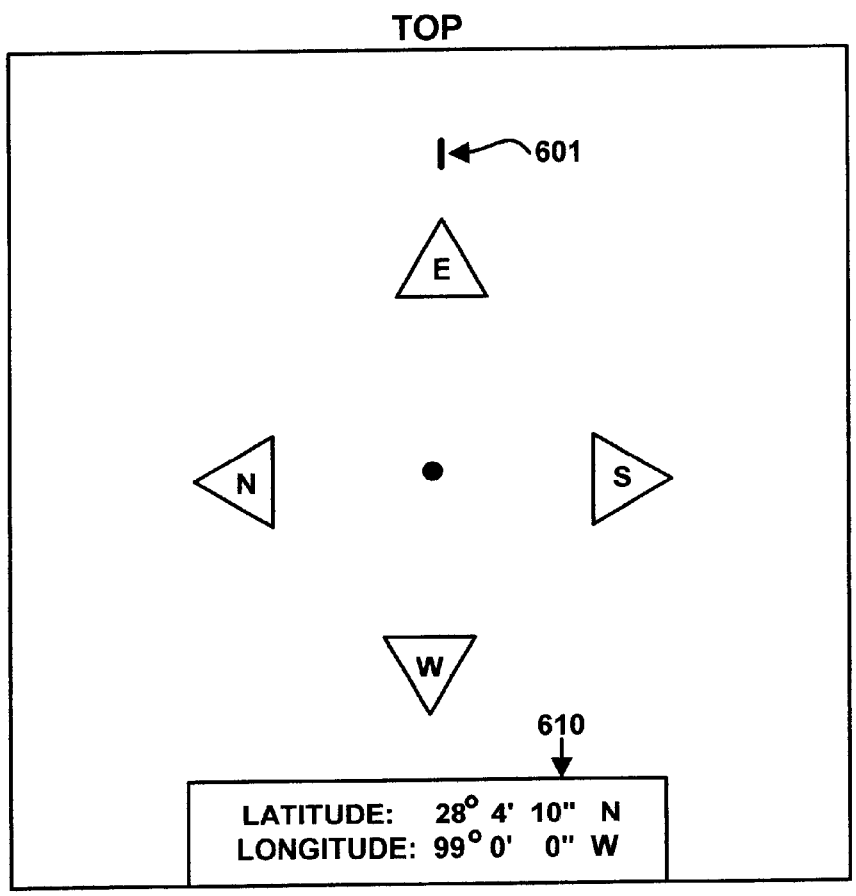
FIG. 8A is a diagram showing an exemplary display that indicates position and heading in accordance with one embodiment of the present claimed invention.
Figure 8B:
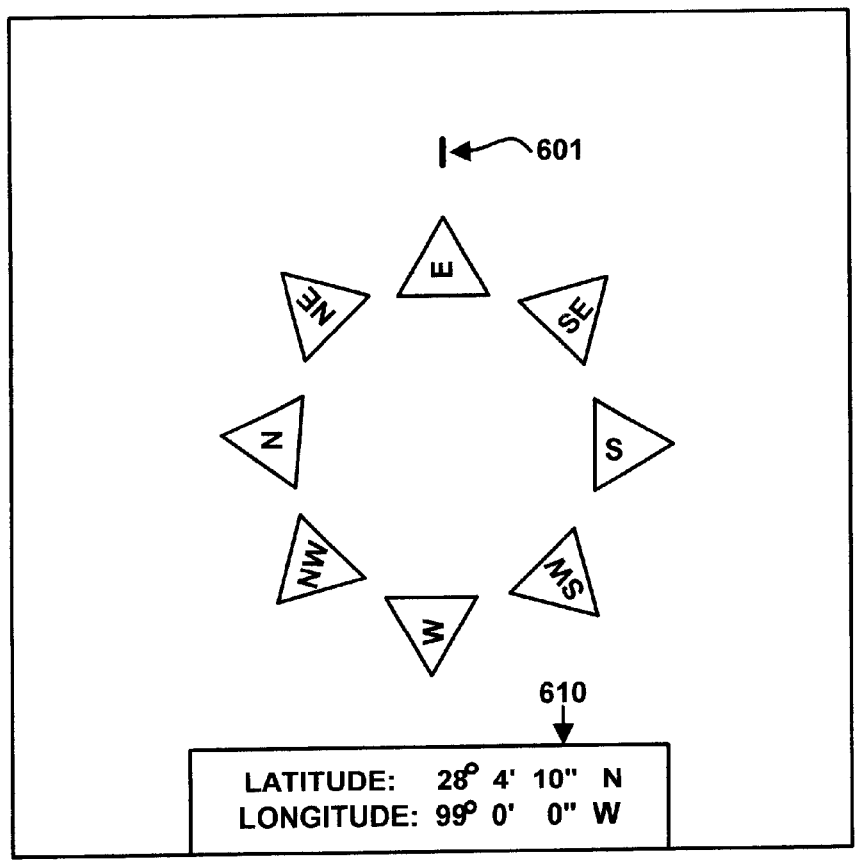
FIG. 8B is a diagram showing an exemplary display that indicates position and direction in accordance with one embodiment of the present claimed invention.

FIGS. 8A–8B show an embodiment in which both a four point compass rose and an eight-point compass rose are used. In the present embodiment, the display of a four-point compass rose indicates that heading (step 505 of FIG. 5) is being displayed while the display of an eight-point compass rose indicates that direction (step 506 of FIG. 5) is being displayed. In the embodiment shown in FIGS. 8A–8B, direction and heading are indicated relative to the top of the display, as indicated by alignment mark 601. It should be understood that the compass rose can be implemented with any number of points (e.g., a 16-point compass rose, etc.).

Now referring to display 800a of FIG. 8A, because the compass point of E is aligned with alignment mark 601, and because a four-point compass rose is displayed, display 800a indicates that the SATPOS has a heading directly to the East. Similarly, in the embodiment shown in FIG. 8B, because the compass point of E is aligned with alignment mark 601, and because an eight-point compass rose is displayed, display 800b indicates a East direction. That is, the SATPOS is oriented such that the top of the display, as indicated by alignment mark 601 is pointing in the cardinal direction of East.

The apparatus and method of the present invention automatically switches between displays of heading and direction as the SATPOS moves and stops moving. Thus, the method and apparatus of the present invention provide an uninterrupted display that can be used to find features, waypoints, etc. In the present embodiment, either heading or direction is continually displayed.

In the present embodiment, the determined position is also indicated. In the embodiment shown in FIGS. 6A–8B, position is indicated alphanumerically using latitude and longitude as shown by icon 610. Alternatively, position is indicated by an icon displayed on a moving map display.

Figure 9A:
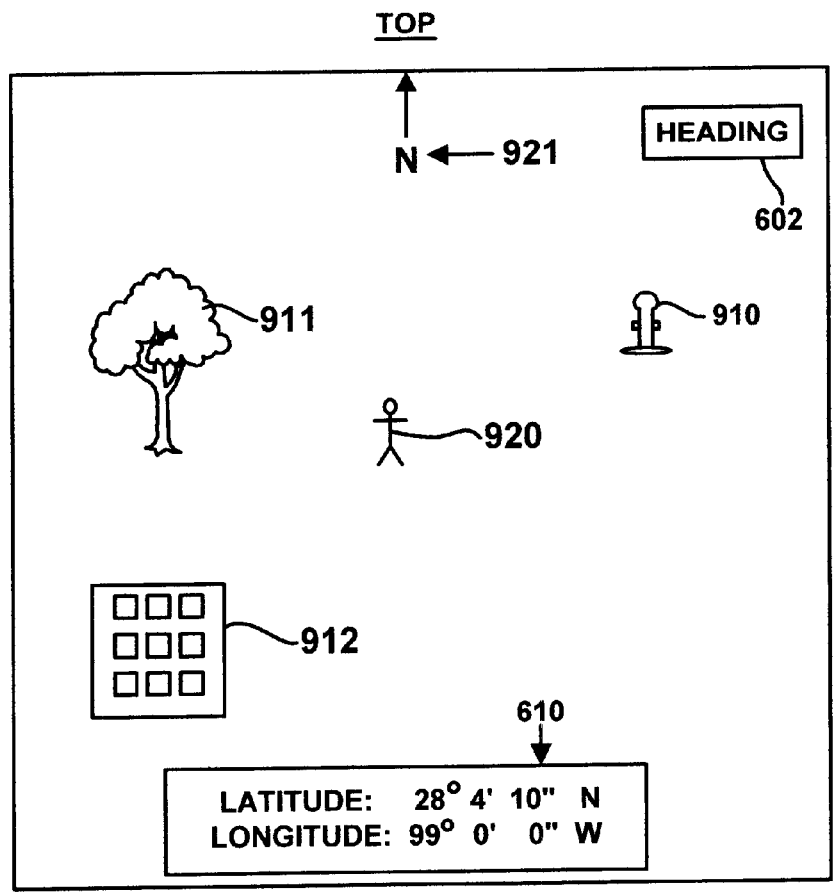
FIG. 9A is a diagram showing an exemplary display that indicates position and heading in accordance with one embodiment of the present claimed invention.
Figure 9B:
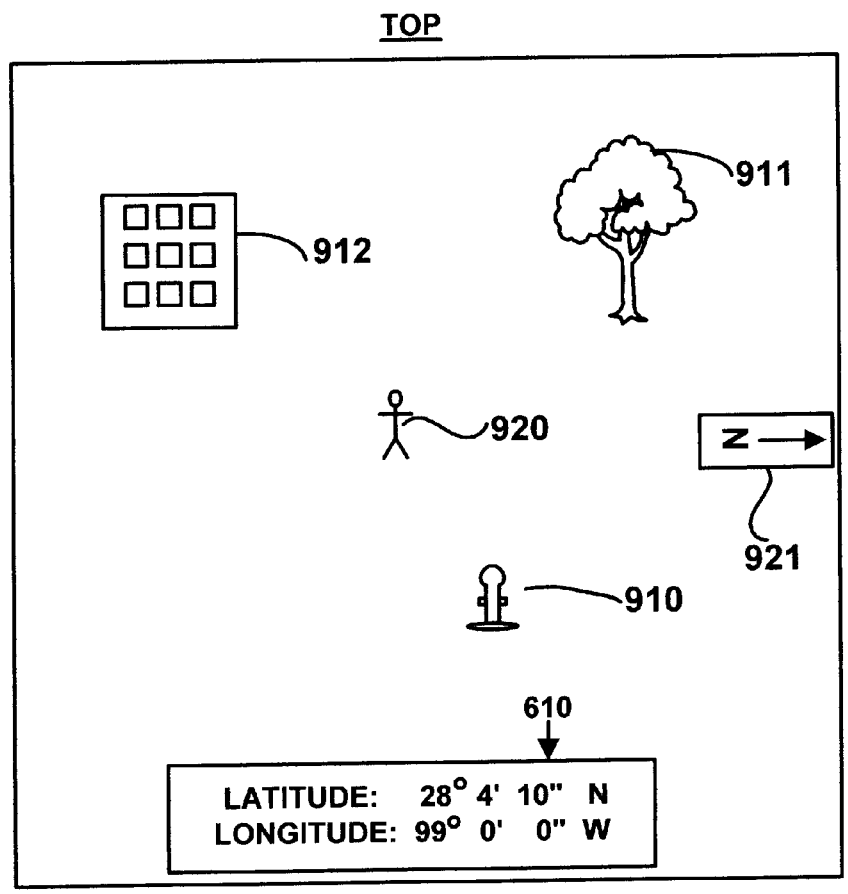
FIG. 9B is a diagram showing an exemplary display that indicates position and direction in accordance with one embodiment of the present claimed invention.

In one embodiment of the present invention, position, direction and heading are indicated using a moving map display. FIGS. 9A–9B shows an exemplary display 900 that includes position icon 920 that indicates the position of the SATPOS relative to icons 910–912 that represent features. In the present embodiment, icon 910 indicates the position of a feature that is a fire hydrant, icon 911 indicates the position of a feature that is a tree, and icon 912 indicates the position of a feature that is a building.

Referring now to FIGS. 9A–9B, exemplary displays 900a and 900b are shown to include position icon 920 that indicates the position of the SATPOS relative to features 910–912. As in the embodiment shown in FIGS. 6A–7B, an icon 602 is displayed to indicate whether direction or heading is being displayed. In the present embodiment, an icon 921 that indicates the direction of North is also displayed so that the user can determine the orientation of the moving map display.

Referring now to FIG. 9A, an exemplary display 900a is shown that indicates a heading of North. That is, because heading icon 602 is displayed, a display of heading is indicated (step 505 of FIG. 5). Because the map is oriented such that the North icon is pointed to the top of the display, the heading is indicated as being directly to the North.

Referring now to FIG. 9B, an exemplary display 900b is shown that indicates a direction of West. That is, because heading icon 602 is not displayed, a display of direction is indicated (step 506 of FIG. 5). Because the map is oriented such that the North icon is pointed to the right side of the display, the direction is indicated as being directly to the West. That is, the display is oriented such that the top of the display points in the cardinal direction of West.

The apparatus and method of the present invention automatically switches between displays of heading and direction as the SATPOS moves and stops moving. Thus, the method and apparatus of the present invention provide an uninterrupted display that can be used to find features such as, for example, features 910–912 of displays 900a–900b.

The present invention is well adapted for other indications of heading and direction other than those shown in FIGS. 6A–9B. In one embodiment, heading and/or direction are indicated using an indication of degrees from 0 to 360 degrees. That is, a number is displayed on the display device that indicates cardinal direction with 0 and 360 being North. That is, in the embodiment shown in FIG. 1, display device 2 displays a number from 0 to 360; and in the embodiment shown in FIGS. 2–3, display device 28 displays a number from 0 to 360.

The embodiments shown in FIGS. 1–9B of the present invention provide a method and apparatus for providing an accurate indication of direction and heading to a user of a SATPOS device. When the user is stationary, position is accurately indicated using a digital compass. When the user is moving, the direction of movement(heading) is accurately indicated. Because the integrated position and direction system of the present invention always indicates either heading or direction, the user is always able to locate features, waypoints, etc.

Prior art digital compasses are typically calibrated manually by rotating the digital compass in a circular arc. The digital compass of the present invention can be manually calibrated using this technique.

In one embodiment of the present invention the digital compass is automatically calibrated using the SATPOS determination of heading. In one embodiment of the present invention, the digital compass is automatically calibrated upon selection of an icon or button that indicates "Automatic Compass Calibration" when the position and direction system of the present invention is moving (e.g. when step 501 of FIG. 5 indicates that the SATPOS is moving).

In one embodiment of the present invention, the digital compass is automatically calibrated on a periodic basis, without any required input from the operator, when the SATPOS is moving. In one embodiment, the digital compass is automatically calibrated according to user selectable time periods. In the present embodiment, the user can select time periods of ten minutes, 30 minutes, one hour, four hours, or 12 hours. Thus, for example, when a user selects a time period of ten minutes, the digital compass is calibrated when the digital compass begins to move and every ten minutes thereafter until the digital compass stops moving. This provides for easily maintaining the accuracy of the digital compass.

In the present embodiment, the digital compass is calibrated by determining heading using the SATPOS, and adjusting the direction indicated by the digital compass according to the heading determined by the satellite positioning system. In the embodiment shown in FIG. 1, controller 1 is operable to automatically calibrate the digital compass; in the embodiment shown in FIGS. 2–3, direction program 22 is operable to automatically calibrate the digital compass; and in the embodiment shown in FIG. 4, direction program 42 is operable to automatically calibrate the digital compass.

Figure 10:
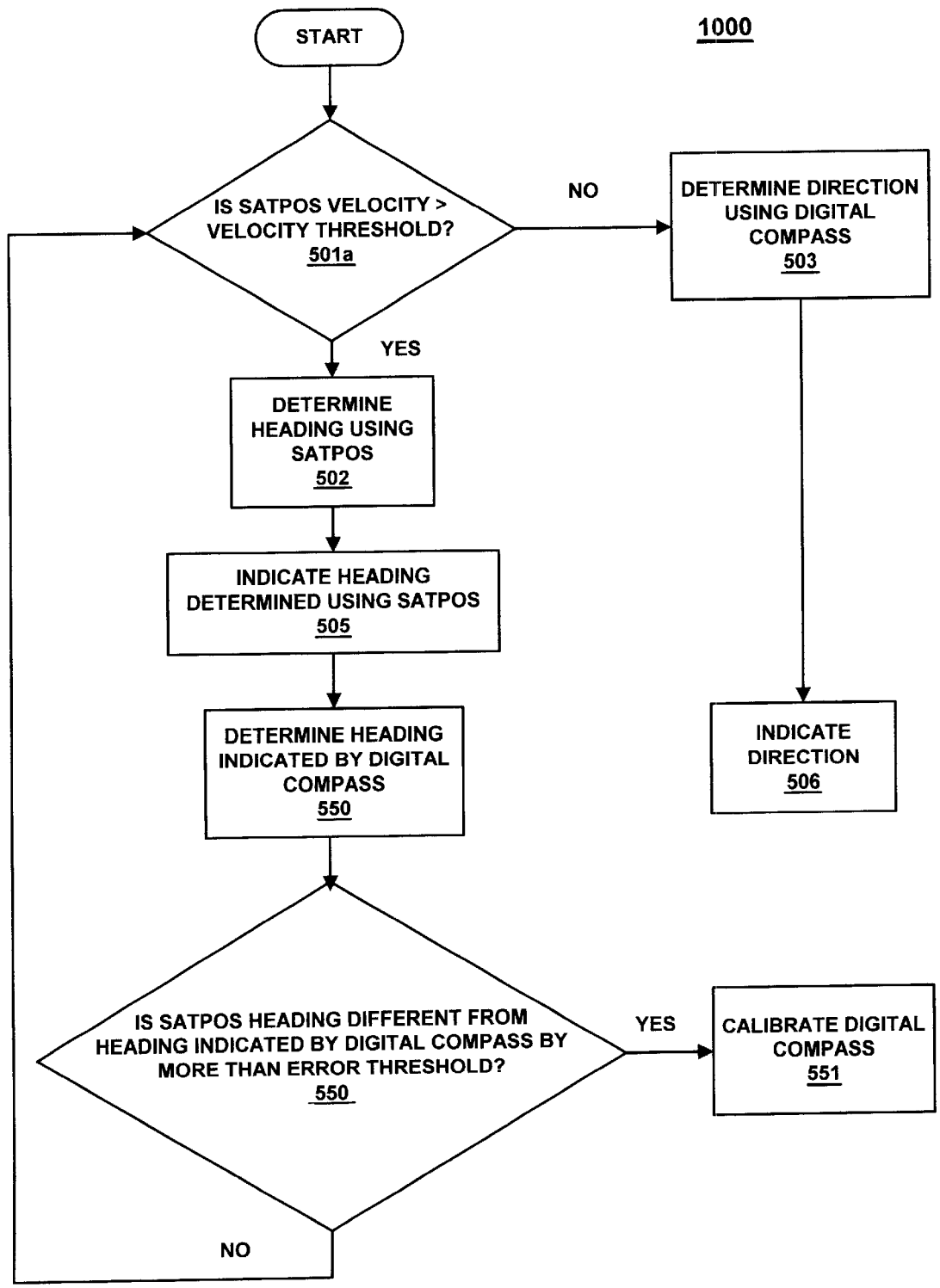
FIG. 10 is a flow chart illustrating a method for calibrating a digital compass in accordance with one embodiment of the present invention.

FIG. 10 shows a method for calibrating a digital compass 1000 in which a digital compass (e.g. digital compass 4 of FIGS. 1–4)is calibrated using a heading determined using a SATPOS (e.g., SATPOS 3 of FIGS. 1–4). Referring now to step 501a the velocity determined by the SATPOS is compared to a threshold velocity. If the velocity is not greater than the threshold velocity (steps 501a and 503), direction is determined using the digital compass(step 503), and direction is indicated as shown by step 506.

Continuing with FIG. 10, if the velocity is not greater than the threshold velocity, heading is determined using the SATPOS as shown by steps 501a and 502. The heading determined using the SATPOS is then indicated as shown by step 505.

Still referring to FIG. 10, as shown by step 550, the heading indicated by the digital compass is determined. In the embodiment shown in FIG. 1, controller 1 is operable to determine the heading indicated by the digital compass using input from digital compass 4; in the embodiment shown in FIGS. 2–3, direction program 22 is operable to determine the heading indicated by the digital compass; and in the embodiment shown in FIG. 4, direction program 42 is operable to determine the heading indicated by the digital compass.

The heading indicated by the digital compass is then compared to the heading determined using the SATPOS as shown by step 550. If the difference between the heading determined using the SATPOS and the heading indicated by the digital compass by more than a predetermined error threshold, the digital compass is calibrated as shown by steps 550–551. In one embodiment, a default error threshold of between one to two percent is initially used, which can be altered by the user at any time to accommodate the needs of that particular user. The present embodiment allows for the automatic calibration of the digital compass whenever the heading indicated by the digital compass significantly varies from the heading determined using the SATPOS.

As discussed above, the present invention provides for automatically calibrating a digital compass, either as a result of user input (e.g., selection of an icon, pressing of a button, etc.), or as a result of user-defined criteria for automatic calibration. That is, the user can program the present invention to automatically calibrate the digital compass (e.g. when velocity exceeds a given threshold, whenever the SATPOS begins moving, periodically while the SATPOS is moving, when the difference between the SATPOS determined heading differs from the heading indicated by the digital compass by more than a predetermined threshold, etc. The integrated position and direction system of the present invention is easy to use since there in no need for a user to manually calibrate the digital compass.

Though the embodiments shown in FIGS. 1–9B describe the indication of either direction or heading, the present invention is well adapted for display of both direction and heading when the SATPOS is moving.

Figure 12:
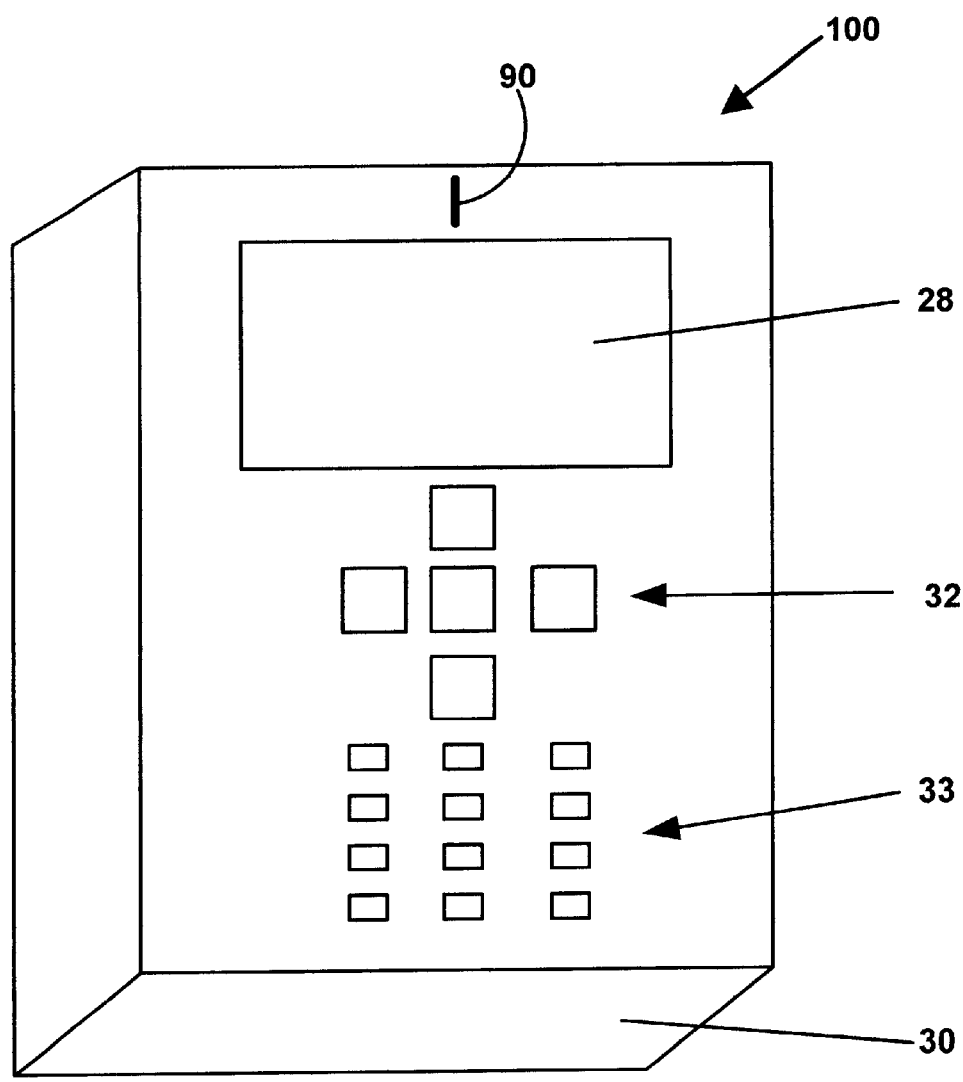
FIG. 12 is a perspective view of an integrated position and direction system 100 in accordance with an embodiment of the present invention that includes a visual alignment mechanism 90.

FIG. 12 is a perspective view of an integrated position and direction system 100 in accordance with an embodiment of the present invention that includes a visual alignment mechanism 90. The integrated position and direction system 100 also includes a compact housing 30 which is palm-size and a display device 28. Moreover, the integrated position and direction system 100 has function keys/buttons 32 and alphanumeric keypad/buttons 33 to enable a user to provide user input to the integrated position and direction system 100. It should be understood that the integrated position and direction system 100 can be configured in any other manner and can include other components.

In one embodiment, the visual alignment mechanism 90 is a line on the top surface of the integrated position and direction system 100. In another embodiment, the visual alignment mechanism 90 is a raised surface extending from the top surface of the integrated position and direction system 100. In an alternate embodiment, the visual alignment mechanism 90 is an icon or other visible indicia displayed on the display device 28.

The integrated position and direction system 100 includes a user input device for coupling user input to the integrated position and direction system 100. In an embodiment, the user utilizes the user input device to interact with information displayed on the display device 28. In one embodiment, a button of the function keys/buttons 32 is used as a user input device. In another embodiment, a button of the alphanumeric keypad/buttons 33 is used as a user input device. In an alternate embodiment, the user input device includes a graphical user interface. It should be understood that any number of other methods can be used for coupling user input to the integrated position and direction system 100.

In one embodiment, the integrated position and direction system 100 determines the position of an offset feature. The term "offset feature" as used herein includes anything that is located at a position other than the position or positions of the integrated position and direction system 100. Examples of offset features include natural features such as trees, rocks, plants, etc., and manmade features such as buildings, telephones poles, fire hydrant, etc. Additionally, offset features can include animals, persons, and all types of inanimate objects. The integrated position and direction system 100 has a satellite position system 3 (SATPOS) and a digital compass 4, as described above.

According to one embodiment of the present invention, the position of an offset feature is determined without physically placing the integrated position and direction system 100 at the location of the offset feature. Thus, if the offset feature is inaccessible for any reason or if it is inconvenient to place the integrated position and direction system 100 at the location of the offset feature, the position of the offset feature can still be determined by employing the method and apparatus of the present invention.

Moreover, by utilizing no more than the integrated position and direction system 100 which is compact and palm-sized, the position of the offset feature is determined, eliminating the need to carry around unwieldy equipment or to set up extensive measuring apparatus to obtain the position of the offset feature. In other words, the integrated position and direction system 100 provides a self-contained, portable apparatus to determine the position of the offset feature in a fast, efficient, and convenient manner.

Figure 13:
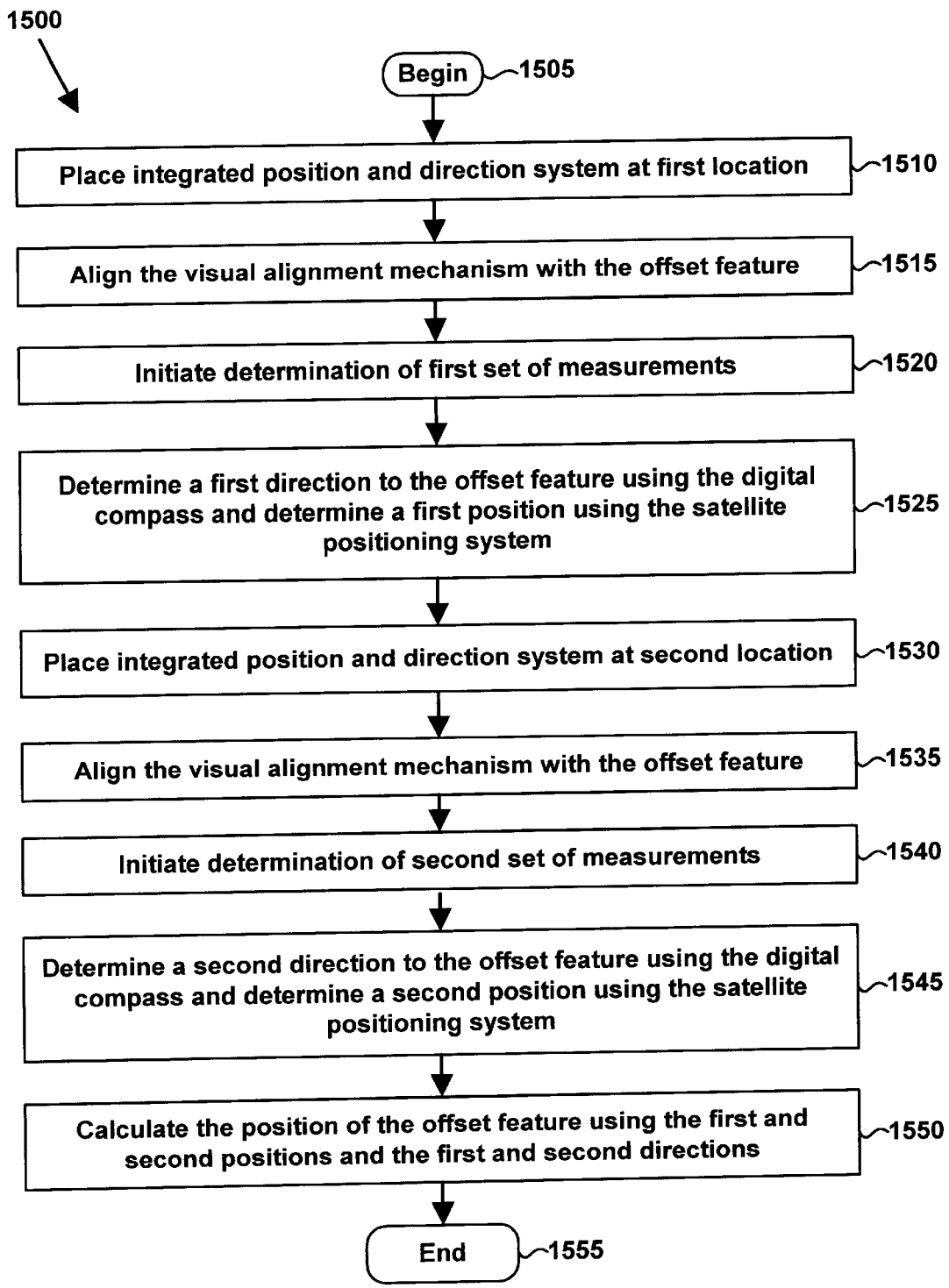
FIG. 13 is a flow chart illustrating a method 1500 of determining position of an offset feature 930 in accordance with an embodiment of the present invention
Figure 14:
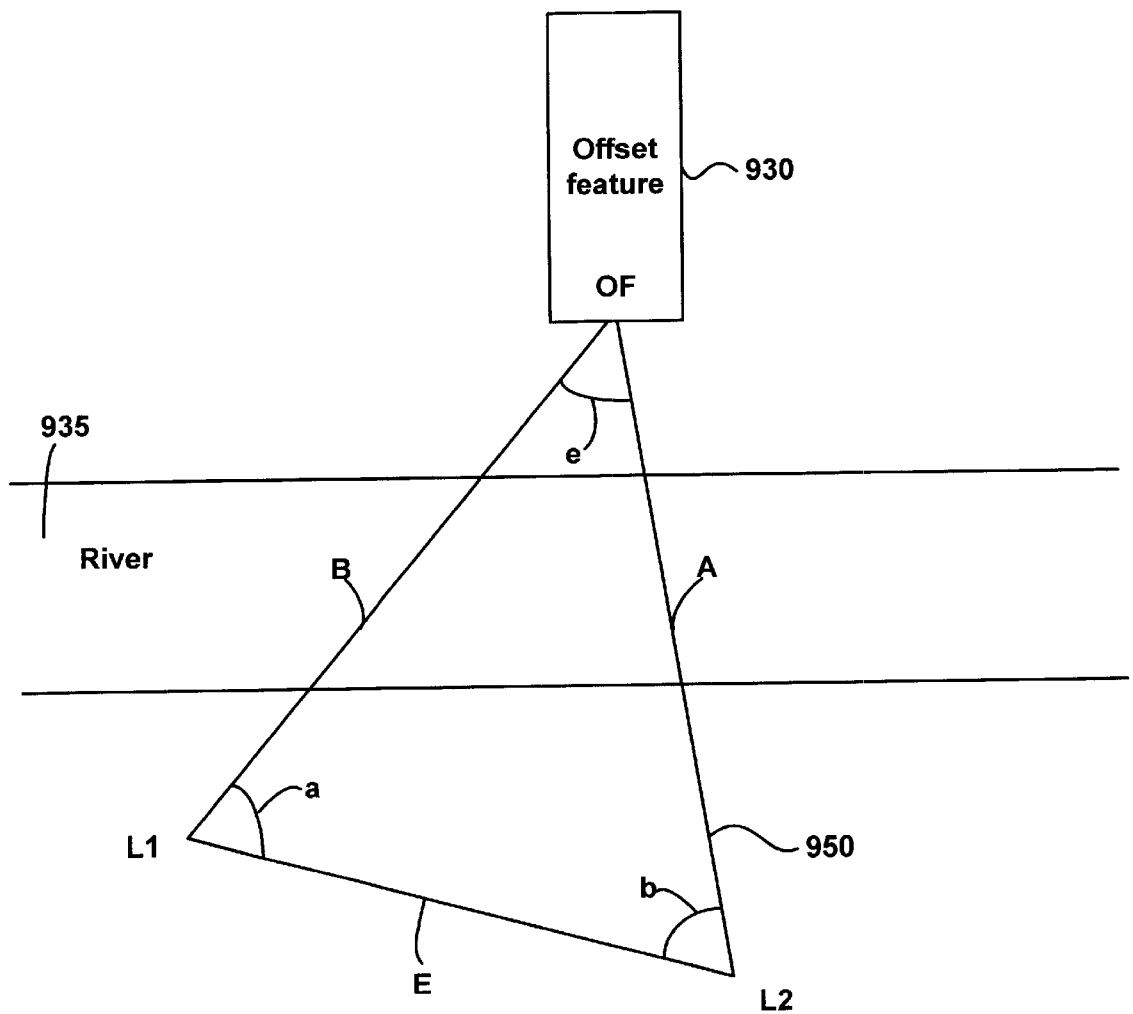
FIG. 14 shows an exemplary diagram in which an integrated position and direction system is located at a first location (L1) and subsequently located at a second location (L2) for determining the location of offset feature 930.

FIG. 13 is a flow chart illustrating a method 1500 of determining position of an offset feature in accordance with an embodiment of the present invention. Reference is made to FIG. 14. The steps of method 1500 are hereafter illustrated with reference to exemplary offset feature 930 of FIG. 14 and exemplary locations L1 and L2 of FIG. 14.

At step 1505, the method of determining position of the offset feature 930 in accordance with an embodiment of the present invention begins.

As shown in FIG. 14, the offset feature 930 is made inaccessible by the river 935. The position of the offset feature 930 is determined by utilizing the integrated position and direction system 100 of the present invention. It should be understood that the first location L1 and the second location L2 can be located differently than shown in FIG. 14.

At step 1510, the integrated position and direction system 100 of the present invention is moved and placed at the first location L1 relative to the location of the offset feature 930.

The integrated position and direction system 100 is compact and palm-sized such that a user can easily move the integrated position and direction system 100 to the first location L1. The first location L1 can be any location that is convenient to the user.

At step 1515, the visual alignment mechanism 90 of the integrated position and direction system 100 is aligned with the offset feature 930.

At step 1520, the user initiates the integrated position and direction system 100 to determine the first set of measurements. In particular, the user operates the integrated position and direction system 100 via a user input device (e.g., by pressing a button of FIG. 12 or by operating a graphical user interface of FIG. 17) to determine the first set of measurements while the integrated position and direction system 100 is aligned with the offset feature 930.

Referring now to step 1525, the integrated position and direction system 100 determines a first direction to the offset feature 930 and a first position of the integrated position and direction system 100. The first direction is determined using the digital compass 4. The first position is determined using the satellite positioning system 3 (SATPOS). The integrated position and direction system 100 stores the first set of measurements. Alternatively, a first heading is determined using the SATPOS 3 rather than determining the first direction to the offset feature using the digital compass 4.

As shown by step 1530, the integrated position and direction system 100 of the present invention is move and placed at the second location L2. The second location L2 can be any location that is convenient to the user. The greater the distance between the first location L1 and the second location L2 the more accurate the computed position of the offset feature can be.

With reference to step 1535, the visual alignment mechanism 90 of the integrated position and direction system 100 is again aligned with the offset feature 930. This alignment affects the accuracy of the calculated position of the offset feature 930.

As shown by step 1540, the user again initiates the integrated position and direction system 100 to determine the second set of measurements. In particular, the user operates the integrated position and direction system 100 via a user input device (e.g., by pressing a button of FIG. 12 or by operating a graphical user interface of FIG. 17) to determine the second set of measurements.

Referring to step 1545, the integrated position and direction system 100 determines a second direction to the offset feature 930 and a second position of the integrated position and direction system 100. The second direction is determined using the digital compass 4. The second position is determined using the satellite positioning system 3 (SATPOS). The integrated position and direction system 100 stores the second set of measurements. Alternatively, a second heading is determined using the SATPOS 3 rather than determining the second direction to the offset feature using the digital compass 4.

As shown by step 1550, the integrated position and direction system 100 calculates the position of the offset feature 930 using the stored first and second sets of measurements (i.e., the first and second directions and the first and second positions). In the present embodiment, the calculated position of the offset feature 930 is displayed on display device 28.

At step 1555, the method in accordance with an embodiment of the present invention ends.

FIG. 14 shows an exemplary diagram in which an integrated position and direction system is located at a first location (L1) and subsequently located at a second location (L2) for determining the location of offset feature 930. In the embodiment shown in FIG. 14, the offset feature 930 is made inaccessible by the river 935. The position of the offset feature 930 is determined by utilizing the integrated position and direction system 100 of the present invention. It should be understood that the first location L1 and the second location L2 can be located differently than shown in FIG. 14. It should be understood that the 2-dimensional position or the 3-dimensional position of the offset feature 930 can be determined by using the integrated position and direction system 100.

FIG. 14 illustrates that the first location L1, the second location L2, and the location of the offset feature 930 form a triangle 950. The triangle 950 has a side A which is the distance between the location of the offset feature 930 and the second location L2, a side E which is the distance between the second location L2 and the first location L1, and a side B which is the distance between the first location L1 and the location of the offset feature 930. In addition, the triangle 950 has an angle a centered at the first location L1, an angle b centered at the second location L2, and an angle e centered at the location of the offset feature 930.

In practice, the first and second sets of measurements (gathered at the first location L1 and the second location L2, respectively) enable the integrated position and direction system 100 to compute the angle a, the angle b, and the side E of the triangle 950. Then, the integrated position and direction system 100 employs trigonometric identities and principles to calculate angle e, side B, and side A of the triangle 950. Since the first and second positions of the first and second locations L1 and L2 have been determined by the SATPOS 3, the integrated position and direction system 100 can determine the position of the offset feature 930 by using the distance B (in the direction to the offset feature measured at the first location L1) in a series of further trigonometric calculations based upon a local grid for latitude-longitude (or other X-Y coordinate system) in which the two known points are first laid out, and the position of the offset feature 930 is determined in relation to these known coordinates. Hence, the position of the offset feature 930 is determined using only the integrated position and direction system 100 which has the digital compass 4 and the SATPOS 3.

FIGS. 15A–15G illustrate exemplary angles and distances that can be used to calculate the position of the offset feature 930 in accordance with an embodiment of the present invention.

Figure 15A:
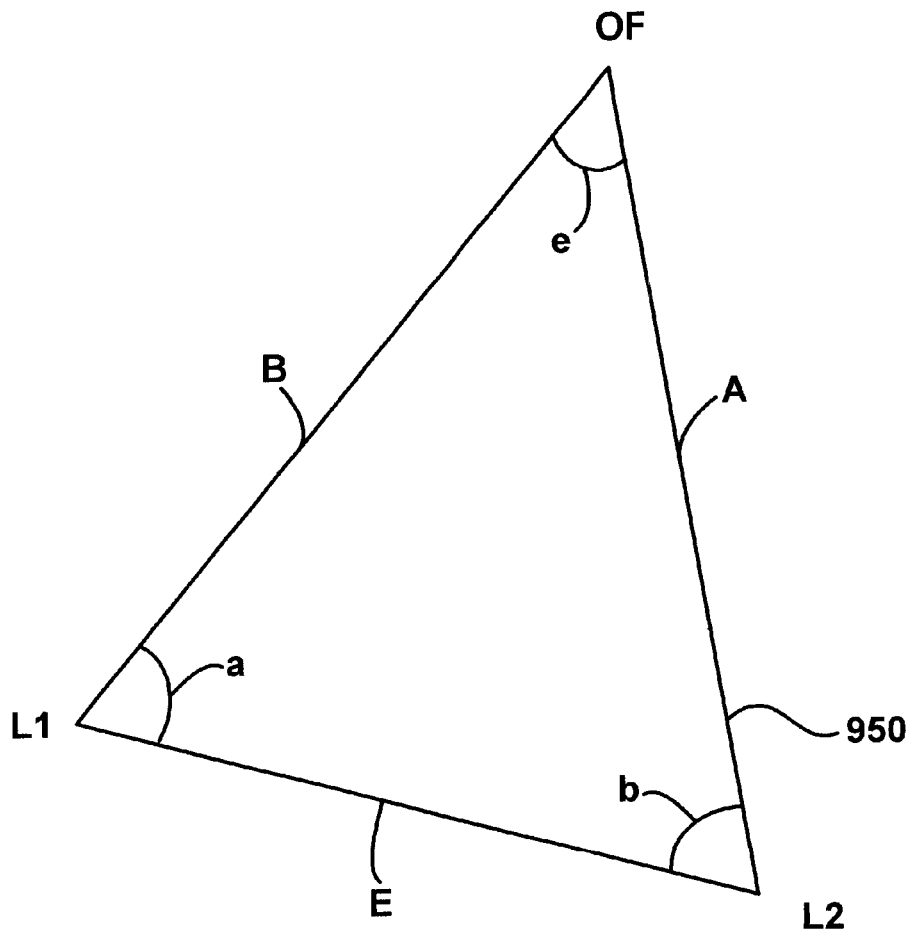
FIGS. 15A–15G illustrate exemplary angles and distances that can be used to calculate the position of the offset feature 930 in accordance with an embodiment of the present invention.

FIG. 15A illustrates the triangle 950 of FIG. 14. Using the first position (measured at the first location L1) and the second position (measured at the second location L2), the integrated position and direction system 100 calculates the distance E.

Figure 15B:
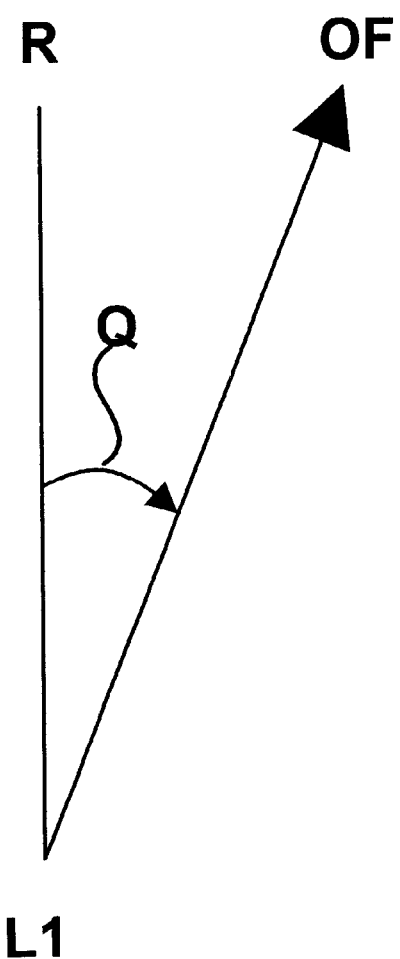

FIG. 15B illustrates that the first direction measured at the first location L1 by the digital compass 4 represents an angle Q measured from the reference meridian R to the location of the offset feature 930.

Figure 15C:
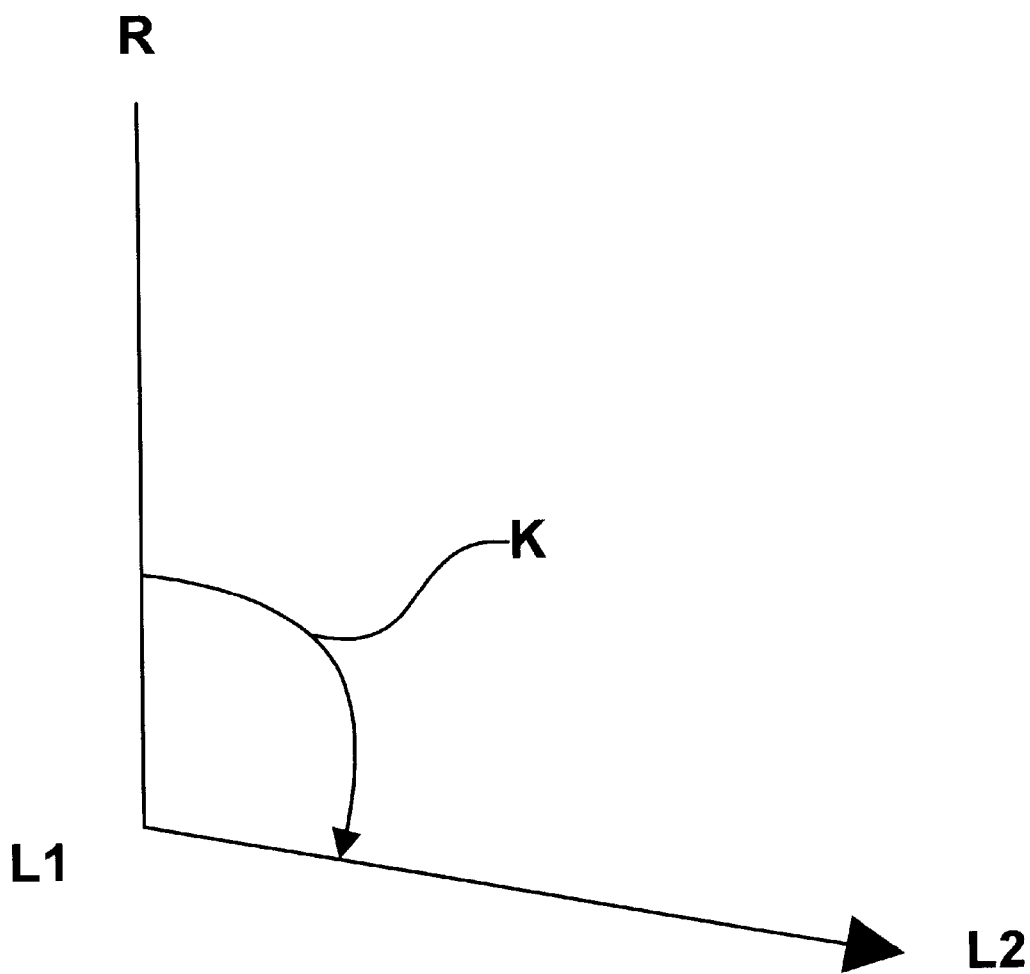

FIG. 15C illustrates that a direction to the second location L2 (relative to the first location L1) represented by the angle K (measured from the reference meridian R to the second location L2) can be determined from the first and second positions measured by the SATPOS 3.

Figure 15D:
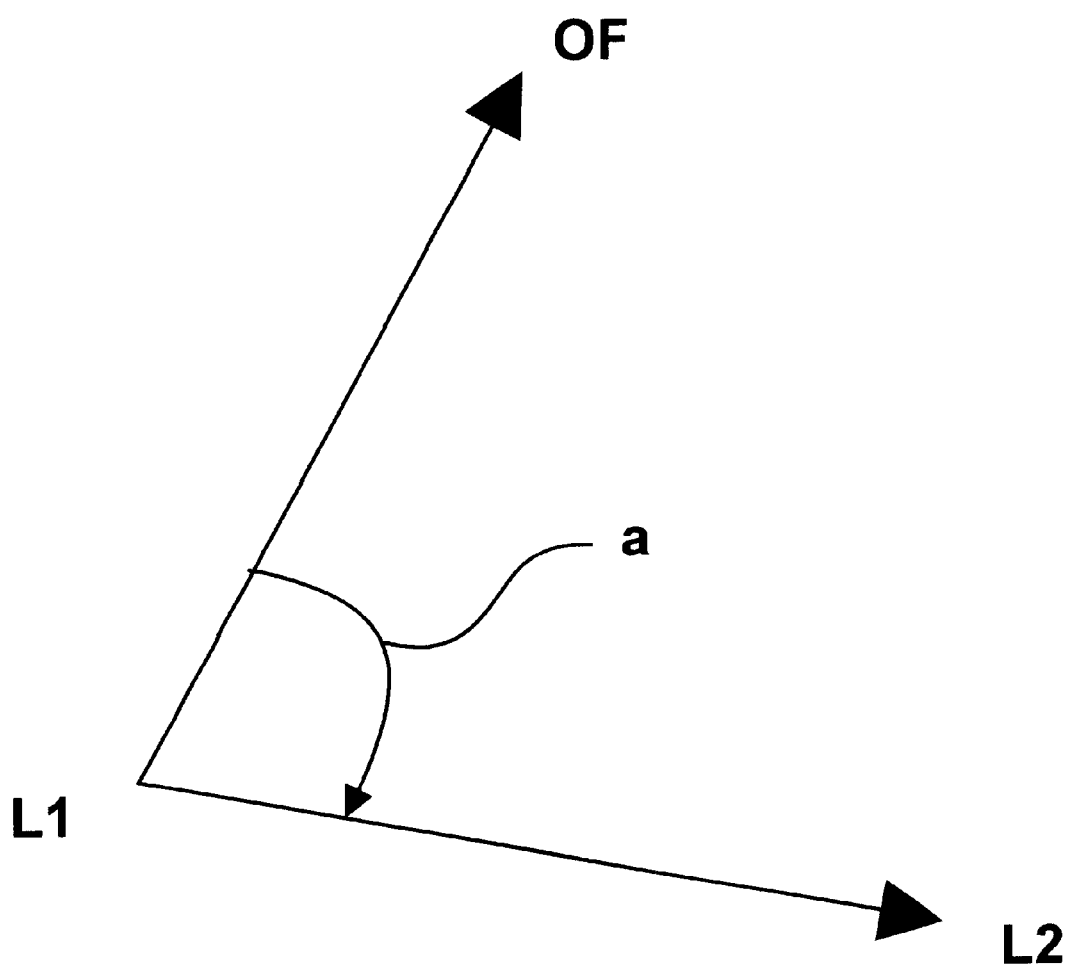

FIG. 15D illustrates that the angle a of the triangle 950 can be determined by taking the absolute value of the difference between angle K and angle Q.

Figure 15E:
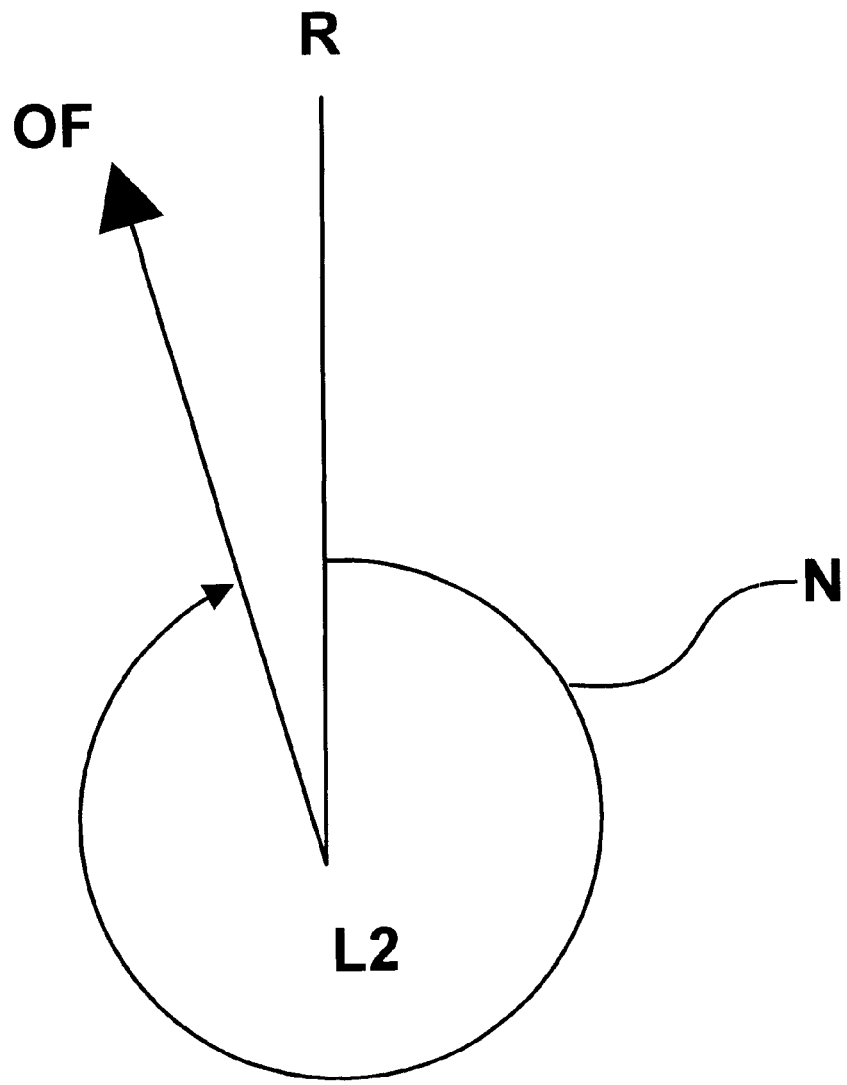

FIG. 15E illustrates that the second direction measured at the second location L2 by the digital compass 4 represents an angle N measured from the reference meridian R to the location of the offset feature 930.

Figure 15F:
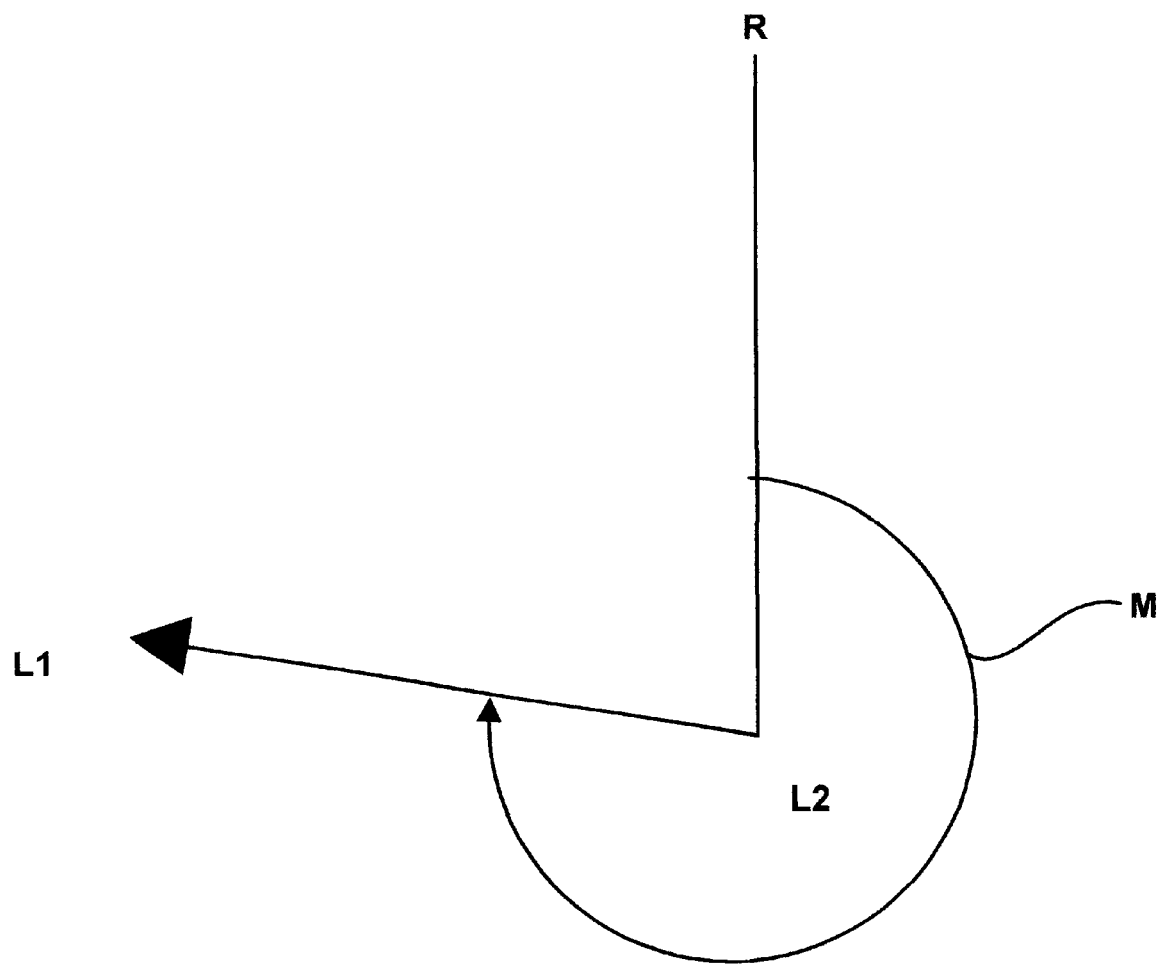

FIG. 15F illustrates that a direction to the first location L1 (relative to the second location L2) represented by the angle M (measured from the reference meridian R to the first location L1) can be determined from the first and second positions measured by the SATPOS 3.

Figure 15G:
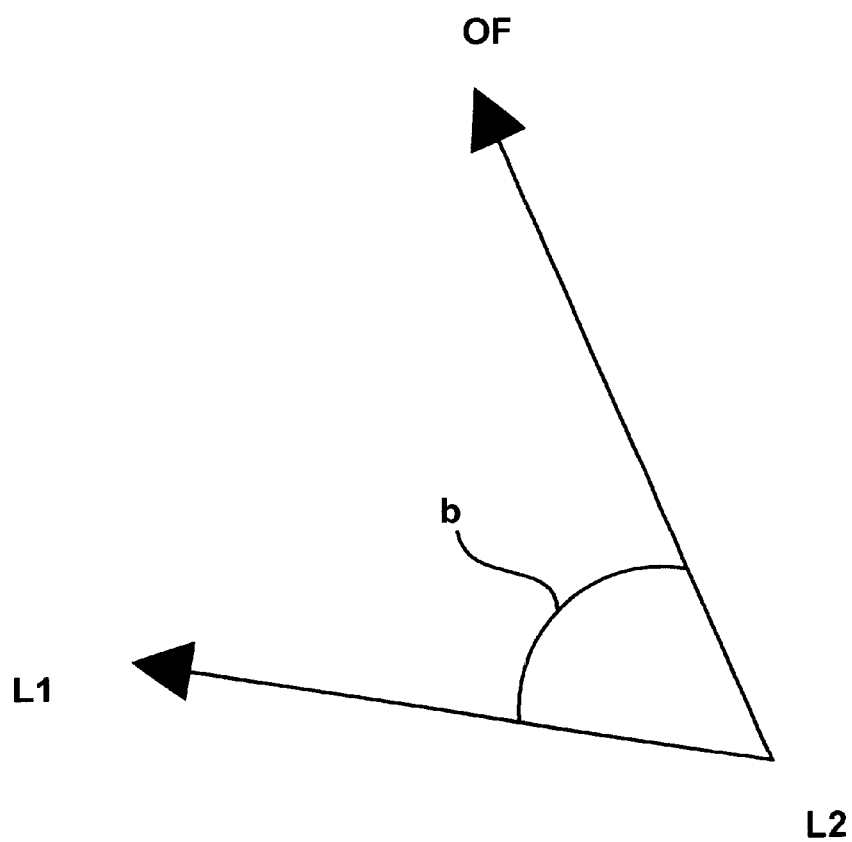

FIG. 15G illustrates that the angle b of the triangle 950 can be determined by taking the absolute value of the difference between angle M and angle N.

Referring again to FIG. 15A, once angle a and angle b are determined, the integrated position and direction system 100 can use a trigonometric identity to compute angle e. In particular, the angles of the triangle 950 produce the sum 180 degrees. Hence, the angle e has the value resulting from 180 degrees minus the angle a and minus the angle b.

Moreover, since the angle a, the angle b, the angle e, and the distance E are now known, the law of sines is utilized to determine the distance B and the distance A of the triangle 950. The law of sines states:

$$(\sin a)/A = (\sin e)/E \quad \text{(eq.1)}$$

$$(\sin b)/B = (\sin e)/E. \quad \text{(eq.2)}$$

In particular, equation 1 is used to determine distance A. Moreover, equation 2 is used to determine distance B.

In one embodiment, the integrated position and direction system 100 incorporates 1) the first direction and 2) the distance B, to the first position measured by the SATPOS 3 at the first location L1 to compute the position of the offset feature 930. In another embodiment, the integrated position and direction system 100 incorporates 1) the second direction and 2) the distance A, to the second position measured by the SATPOS 3 at the second location L2 to compute the position of the offset feature 930. It should be understood that the position of the offset feature 930 can be calculated from the first and second sets of measurements using any of a number of other different methods.

Though method 1500 of FIG. 13 shows the calculation of the position of an offset feature using only two locations (L1 and L2), the present invention can use more locations for more accurately determining the location of an offset feature.

Figure 16:
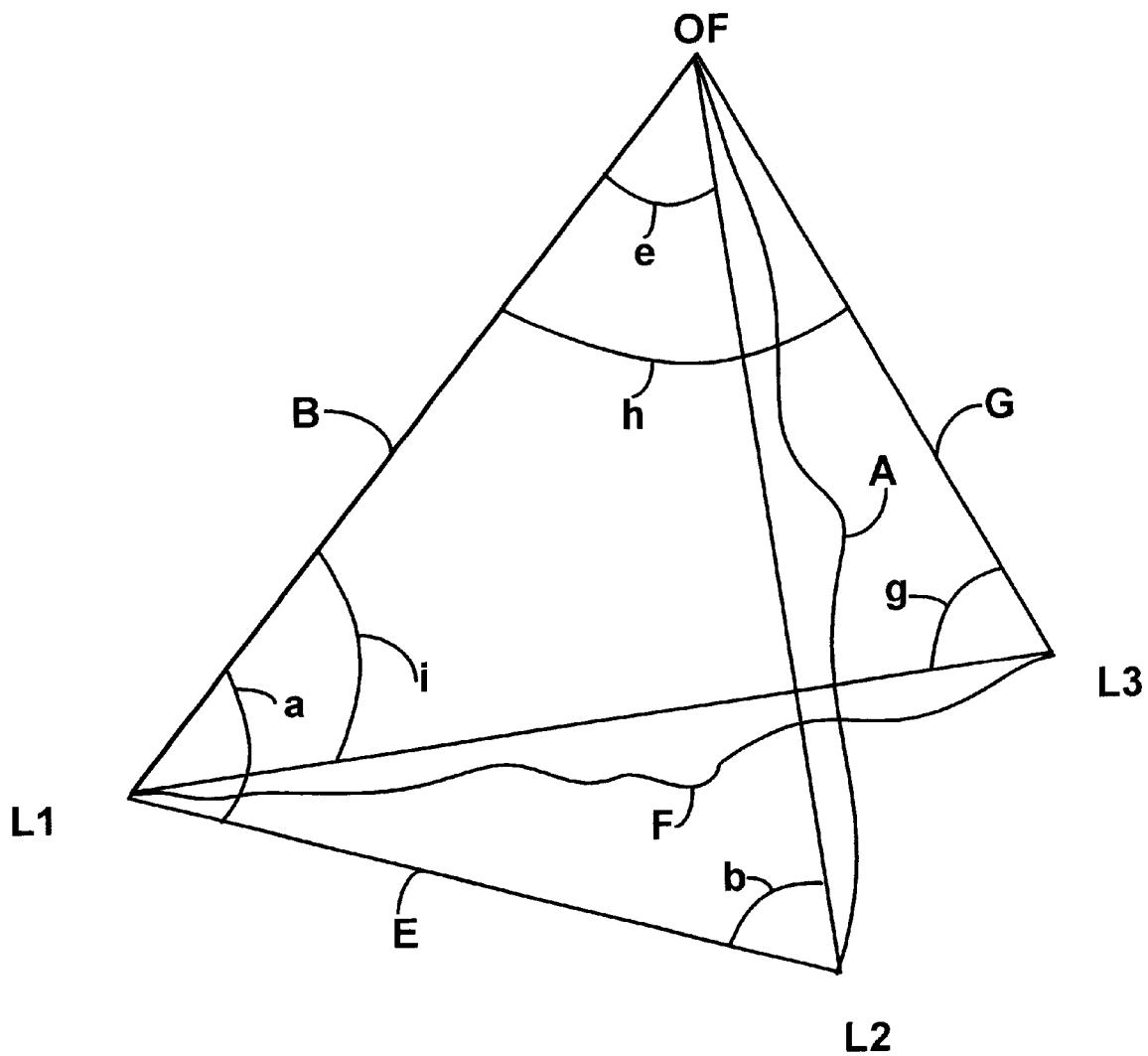
FIG. 16 shows an exemplary diagram in which an integrated position and direction system is located at a first location (L1) and subsequently located at a second location (L2) and subsequently moved to a third location (L3) for determining the location of offset feature.

FIG. 16 shows an exemplary diagram in which an integrated position and direction system is located at a first location (L1) and subsequently located at a second location (L2) and subsequently moved to a third location (L3) for determining the location of offset feature. In one embodiment, the integrated position and direction system 100 is moved and placed at a third location L3 and a third set of measurements are determined using the digital compass 4 and the SATPOS 3, as described above. The first triangle formed by the first location L1, the second location L2, and the location of the offset feature is used to obtain a first computed position of the offset feature. The second triangle formed by the first location L1, the third location L3, and the location of the offset feature is used to obtain a second computed position of the offset feature. It should be understood that the integrated position and direction system 100 can be placed at more than three locations relative to the location of the offset feature.

In one embodiment, the integrated position and direction system 100 verifies the accuracy of the computed position of the offset feature by checking that the difference between the first and second computed positions of the offset feature is within a threshold level. The threshold level can be set to any value by the user. In another embodiment, if the difference is not within the threshold value, the integrated position and direction system 100 prompts the user to restart the procedure (illustrated in FIG. 13) for determining the position of the offset feature.

In another embodiment, the integrated position and direction system 100 computes the average of the first computed position of the offset feature and the second computed position of the offset feature, whereas the average of these computed positions is designated as the position of the offset feature.

Figure 17:
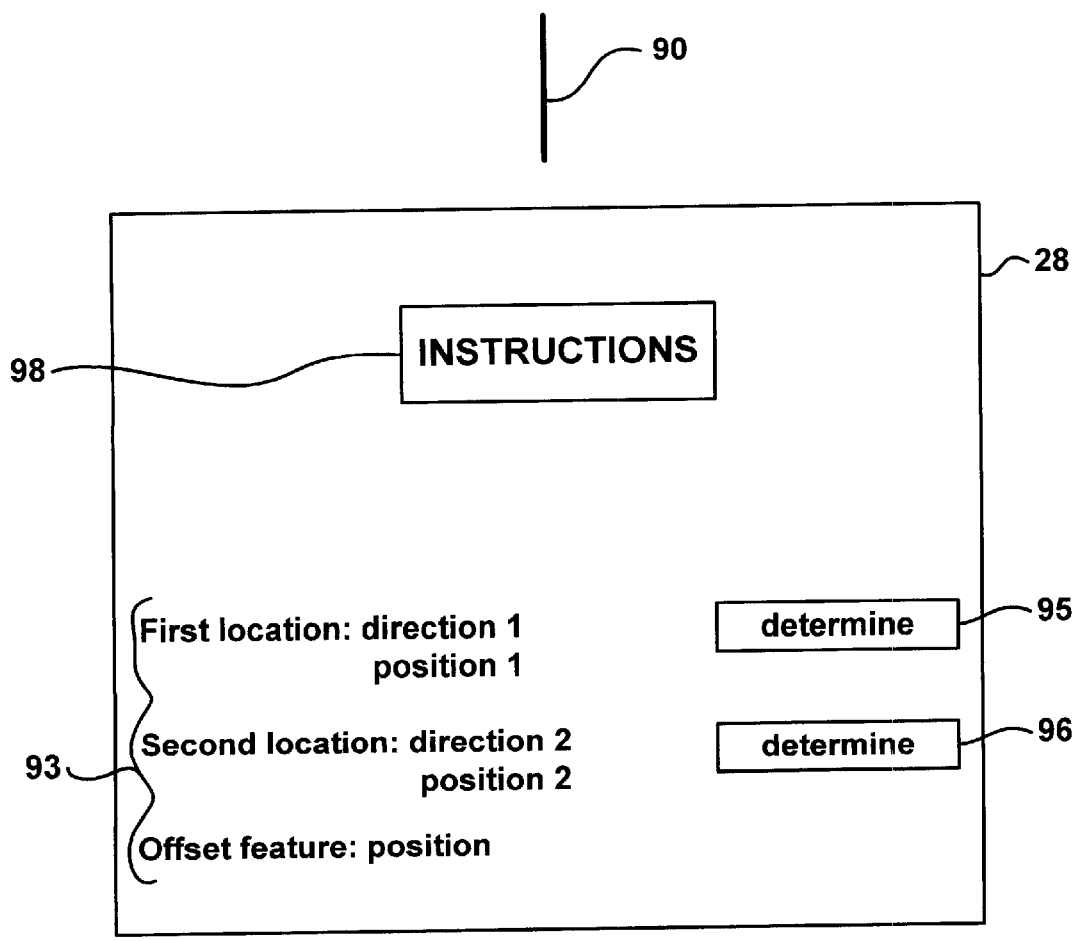
FIG. 17 illustrates an embodiment that includes a graphical user interface that is used for determining the position of an offset feature.

FIG. 17 illustrates an embodiment that includes a graphical user interface that is used for determining the position of an offset feature. In one embodiment, the user input device is a graphical user interface displayed on the display screen of display device 28. In one embodiment, the graphical user interface includes instructions 98 for operating the integrated position and direction system 100 to determine the position of the offset feature. Moreover, the graphical user interface includes a plurality of displayed data 93 representing the calculated position of the offset feature and the sets of measurements obtained at the plurality of locations.

In addition, the graphical user interface includes a first icon 95 and a second icon 96, whereas the user invokes the appropriate icon to cause the integrated position and direction system 100 to determine the direction to the offset feature and to determine the position of the integrated position and direction system 100, at the respective locations. It should be understood that the first icon 95 and the second icon 96 can also be implemented as menu items or using any number of user interface devices. As described above, the user aligns the visual alignment mechanism 90 with the offset feature before causing the integrated position and direction system 100 to determine the set of measurements at each location. It should be understood that the graphical user interface can be configured in any of a number of other manners. Other embodiments of the graphical user interface allow the user to place the integrated position and direction system 100 at more than two locations for determining the location of an offset feature.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of determining a position of an offset feature using an integrated position and direction system (IPADS) having a satellite positioning system and a digital compass, said method comprising the steps of:
    a) aligning said IPADS relative to said offset feature at a first location;
    b) determining a first set of measurements at said first location by using said satellite positioning system and said digital compass;
    c) aligning said IPADS relative to said offset feature at a second location;
    d) determining a second set of measurements at said second location by using said satellite positioning system and said digital compass; and
    e) using said first and second sets of measurements to calculate said position of said offset feature.

2. A method as recited in claim 1 wherein said IPADS includes a visual alignment mechanism, and wherein said step a) includes aligning said alignment mechanism with said offset feature.

3. A method as recited in claim 2 wherein said step c) includes aligning said visual alignment mechanism with said offset feature.

4. A method as recited in claim 3 wherein said visual alignment mechanism comprises a line on a top surface of said IPADS.

5. A method as recited in claim 3 wherein said visual alignment mechanism comprises a raised surface extending from a top surface of said IPADS.

6. A method as recited in claim 1 wherein said first set of measurements includes a first direction indicating orientation of said offset feature relative to said first location, wherein said second set of measurements includes a second direction indicating orientation of said offset feature relative to said second location, wherein said first direction and said second direction are determined by using said digital compass.

7. A method as recited in claim 1 wherein said first set of measurements includes a first position determined by using said satellite positioning system, and wherein said second set of measurements includes a second position determined by using said satellite positioning system.

8. A method as recited in claim 1 wherein said IPADS includes a user input device for allowing a user to operate said IPADS to determine said position of said offset feature, wherein said step b) is initiated by operation of said user input device, and wherein said step d) is initiated by operation of said user input device.

9. A method as recited in claim 8 wherein said user input device comprises a button.

10. A method as recited in claim 8 wherein said user input device comprises a graphical user interface.

11. A method as recited in claim 1 further comprising displaying said position of said offset feature.

12. A method as recited in claim 1 wherein said step e) further comprises the steps of:
    aligning said IPADS relative to said offset feature at a third location;
    determining a third set of measurements at said third location using said satellite positioning system and said digital compass; and
    using said first, second and third sets of measurements to calculate said position of said offset feature.

13. A method of determining a position of an offset feature using an integrated position and direction system (IPADS) having a satellite positioning system and a digital compass, said method comprising the steps of:
    a) at a first location, determining a first position using said satellite positioning system and determining a first direction to said offset feature using said digital compass;
    b) at a second location, determining a second position using said satellite positioning system and determining a second direction to said offset feature using said digital compass; and
    c) calculating said position of said offset feature using said first and second positions and said first and second directions.

14. A method as recited in claim 13 wherein said IPADS includes a visual alignment mechanism, and wherein said step a) includes aligning said alignment mechanism with said offset feature.

15. A method as recited in claim 14 wherein said step b) includes aligning said visual alignment mechanism with said offset feature.

16. A method as recited in claim 15 wherein said visual alignment mechanism comprises a line on a top surface of said IPADS.

17. A method as recited in claim 15 wherein said visual alignment mechanism comprises a raised surface extending from a top surface of said IPADS.

18. A method as recited in claim 13 wherein said IPADS includes a user input device for allowing a user to operate said IPADS to determine said position of said offset feature, wherein said step a) is initiated by operation of said user input device, and wherein said step b) is initiated by operation of said user input device.

19. A method as recited in claim 18 wherein said user input device comprises a button.

20. A method as recited in claim 18 wherein said user input device comprises a graphical user interface.

21. A method as recited in claim 13 further comprising displaying said position of said offset feature.

22. A method as recited in claim 13 further comprising the steps of:
   d) at a third location, determining a third position using said satellite positioning system and determining a third direction to an offset feature using said digital compass; and
   e) using said positions of steps a), b) and d) and said directions of steps a), b), and d) to calculate said position of said offset feature.

23. An integrated position and direction system (IPADS) for determining the position of an offset feature, comprising:
   a) a satellite positioning system (SPS) for determining a plurality of positions using satellite position determining signals;
   b) a digital compass for determining a plurality of directions;
   c) a user input device for receiving user input; and
   d) a processor coupled to said SPS, coupled to said digital compass, and coupled to said user input device, wherein said processor is operable in response to operation of said user input device to determine said position of said offset feature using said positions and said directions.

24. An integrated position and direction system as recited in claim 23 wherein said user input device comprises a button.

25. An integrated position and direction system as recited in claim 23 wherein said user input device comprises a graphical user interface.

26. An integrated position and direction system as recited in claim 23 wherein said satellite positioning system uses satellites of the U.S. Global Positioning System to determine said positions.

27. An integrated position and direction system as recited in claim 23 wherein said digital compass includes at least three sensors.

28. An integrated position and direction system as recited in claim 23 further comprising a housing, said SPS, said digital compass, and said processor disposed in said housing.

29. An integrated position and direction system as recited in claim 28 wherein said housing is palm-sized.

30. An integrated position and direction system as recited in claim 28 further comprising a visual alignment mechanism for facilitating aligning said IPADS with said offset feature.

31. An integrated position and direction system as recited in claim 30 wherein said visual alignment mechanism comprises a line on a top surface of said housing.

32. An integrated position and direction system as recited in claim 30 wherein said visual alignment mechanism comprises a raised surface extending from a top surface of said housing.

* * * * *